United States Patent
Chung et al.

(10) Patent No.: US 11,496,273 B2
(45) Date of Patent: Nov. 8, 2022

(54) METHOD FOR TRANSMITTING AND RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Jaehoon Chung, Seoul (KR); Jiwon Kang, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 216 days.

(21) Appl. No.: 17/043,850

(22) PCT Filed: Apr. 2, 2019

(86) PCT No.: PCT/KR2019/003905
§ 371 (c)(1),
(2) Date: Sep. 30, 2020

(87) PCT Pub. No.: WO2019/194555
PCT Pub. Date: Oct. 10, 2019

(65) Prior Publication Data
US 2021/0099272 A1    Apr. 1, 2021

(30) Foreign Application Priority Data
Apr. 2, 2018 (KR) .................. 10-2018-0037963

(51) Int. Cl.
*H04L 12/26* (2006.01)
*H04L 5/00* (2006.01)
*H04W 72/04* (2009.01)

(52) U.S. Cl.
CPC ....... *H04L 5/0057* (2013.01); *H04W 72/0406* (2013.01)

(58) Field of Classification Search
USPC .................. 370/241, 252, 311, 328, 329, 332
See application file for complete search history.

(56) References Cited

U.S. PATENT DOCUMENTS

| | | | | |
|---|---|---|---|---|
| 2013/0329664 A1* | 12/2013 | Kim | ...................... | H04W 24/10 370/329 |
| 2014/0044044 A1* | 2/2014 | Josiam | .................. | H04B 7/0639 370/328 |

(Continued)

FOREIGN PATENT DOCUMENTS

| | | |
|---|---|---|
| KR | 20170112897 | 10/2017 |
| WO | WO2018021867 | 2/2018 |

OTHER PUBLICATIONS

Nokia, Nokia Shanghai Bell, "Remaining issues on mobility measurements," R1-1802895, 3GPP TSG-RAN WG1meeting #92, Athens, Greece Feb. 26-Mar. 2, 2018, 10 pages.

(Continued)

*Primary Examiner* — Nguyen H Ngo
(74) *Attorney, Agent, or Firm* — Fish & Richardson P.C.

(57) ABSTRACT

A method for a base station to receive channel state information in a wireless communication system is disclosed. The method includes transmitting, to a plurality of user equipments (UEs), CSI-RS for calculating the channel state information; receiving, from the plurality of UEs, angular information related to a channel state between the base station and the plurality of UEs based on the CSI-RS; transmitting, to the plurality of UEs, configuration information for calculating the channel state based on the angular information, the configuration information including information determining an operation mode of the plurality of (Continued)

UEs; and receiving, from the plurality of UEs, the channel state information calculated based on the operation mode.

12 Claims, 16 Drawing Sheets

(56) References Cited

U.S. PATENT DOCUMENTS

| | | | |
|---|---|---|---|
| 2016/0156401 A1 | 6/2016 | Onggosanusi et al. | |
| 2018/0097595 A1* | 4/2018 | Huang | H04L 1/0009 |
| 2019/0044589 A1* | 2/2019 | Park | H04B 7/0408 |

OTHER PUBLICATIONS

PCT International Search Report in International Appln. No. PCT/KR2019/003905, dated Jul. 24, 2019, 7 pages (with English translation).

ZTE, Sanechips, "Enhancements on CSI framework," R1-1717427, 3GPP TSG RAN WG1 Meeting #90bis, Prague, Czech Republic, Oct. 9-13, 2017, 10 pages.

* cited by examiner

【Figure 1】
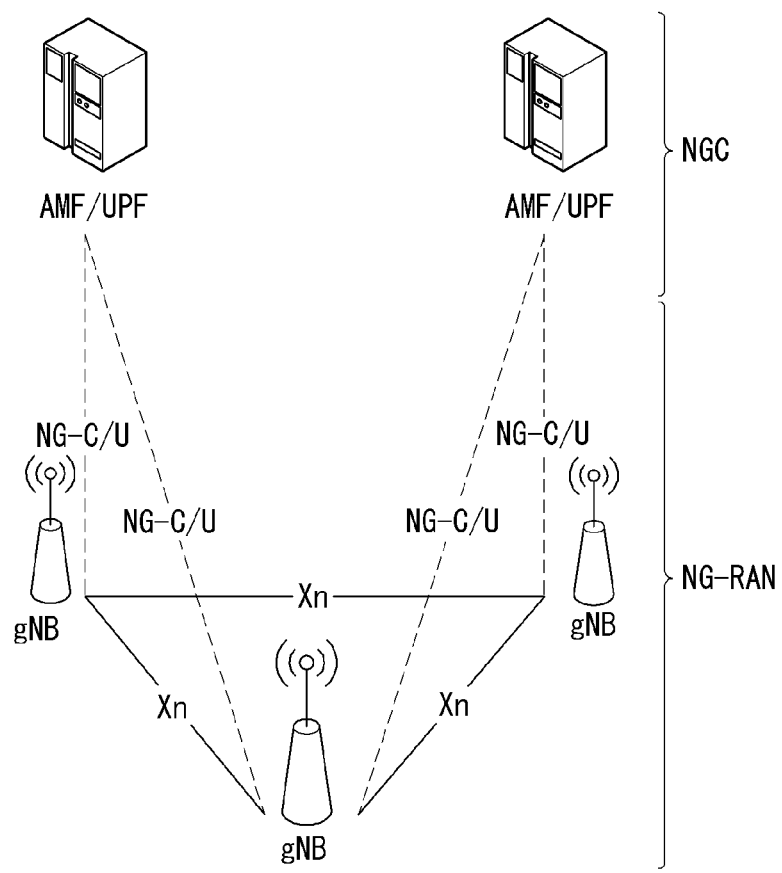
【Figure 2】
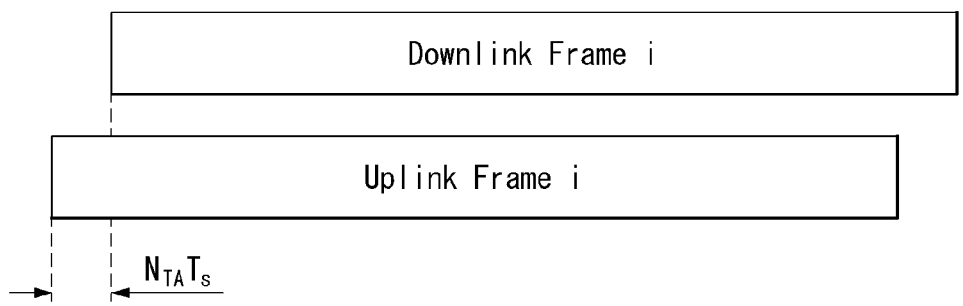

[Figure 3]
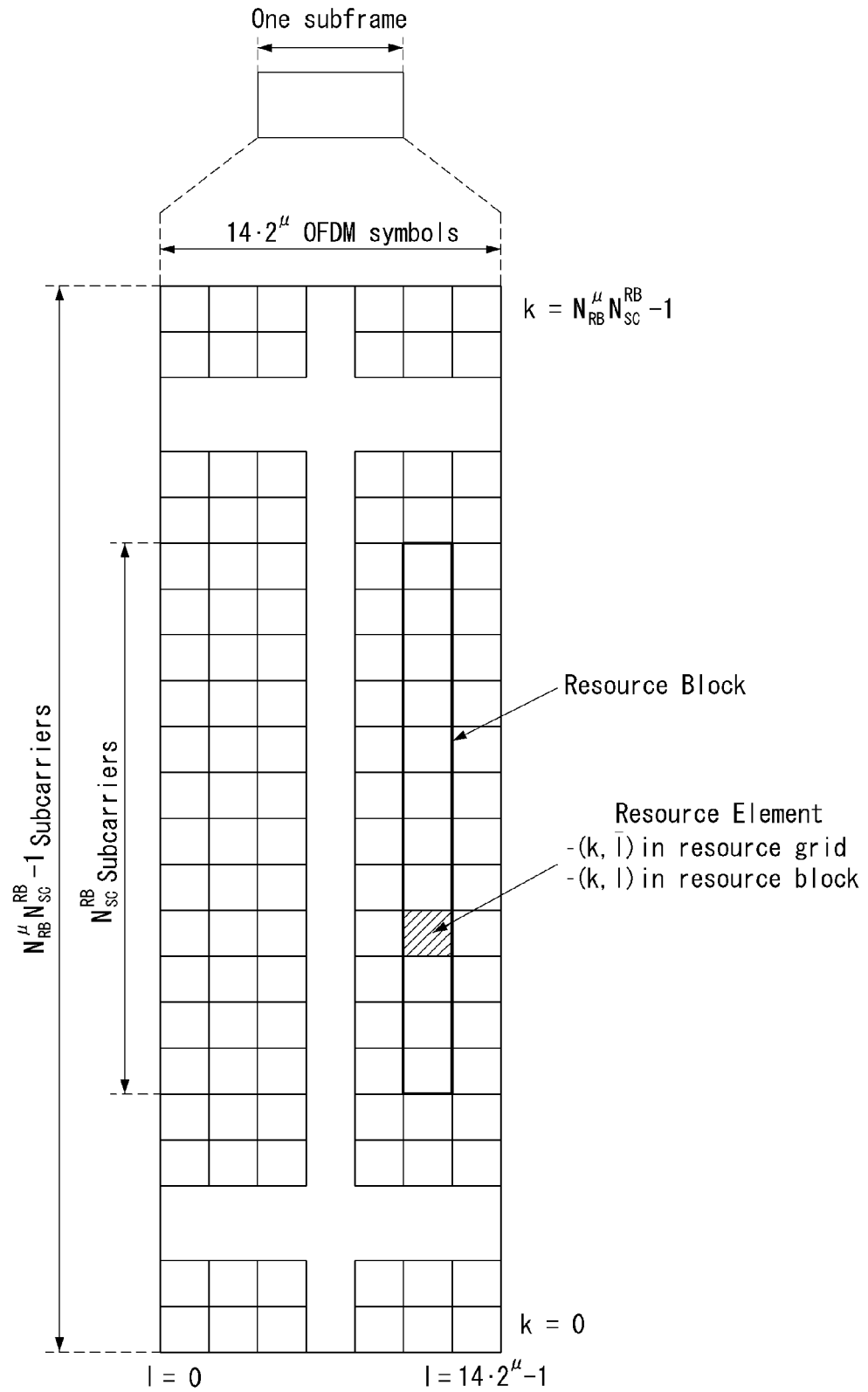

[Figure 4]
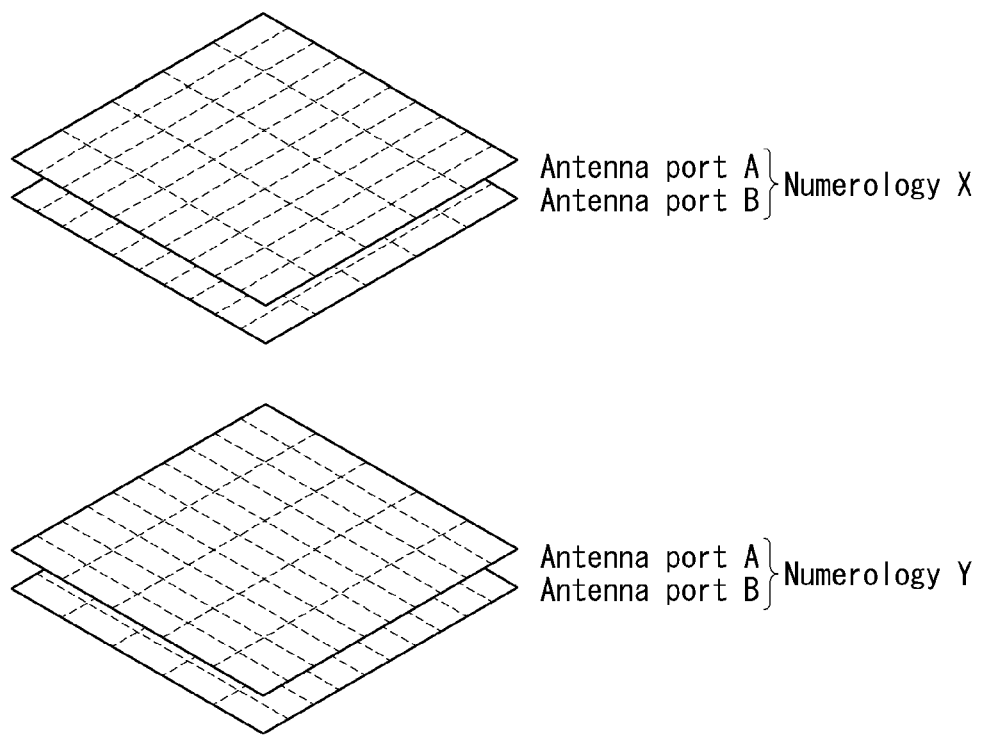

[Figure 5]
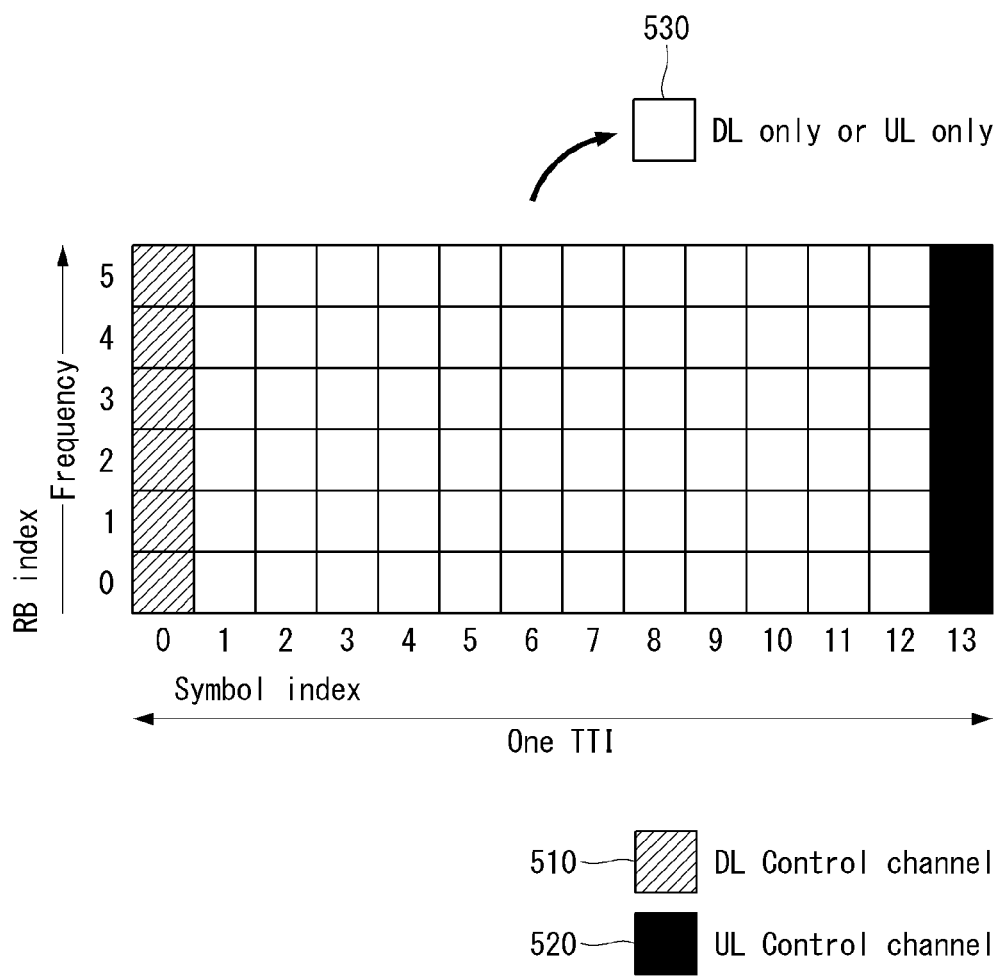

【Figure 6】
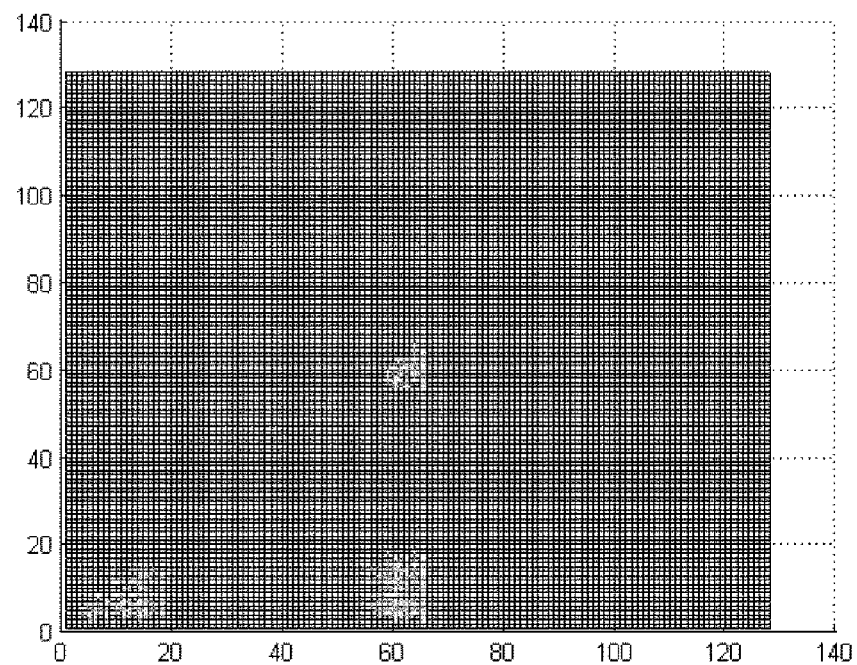
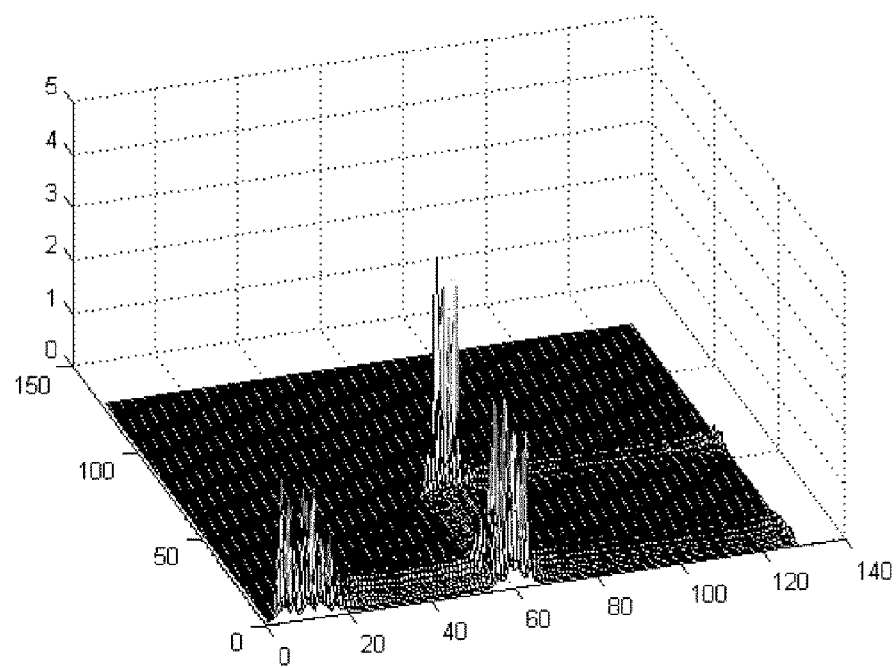

【Figure 7】
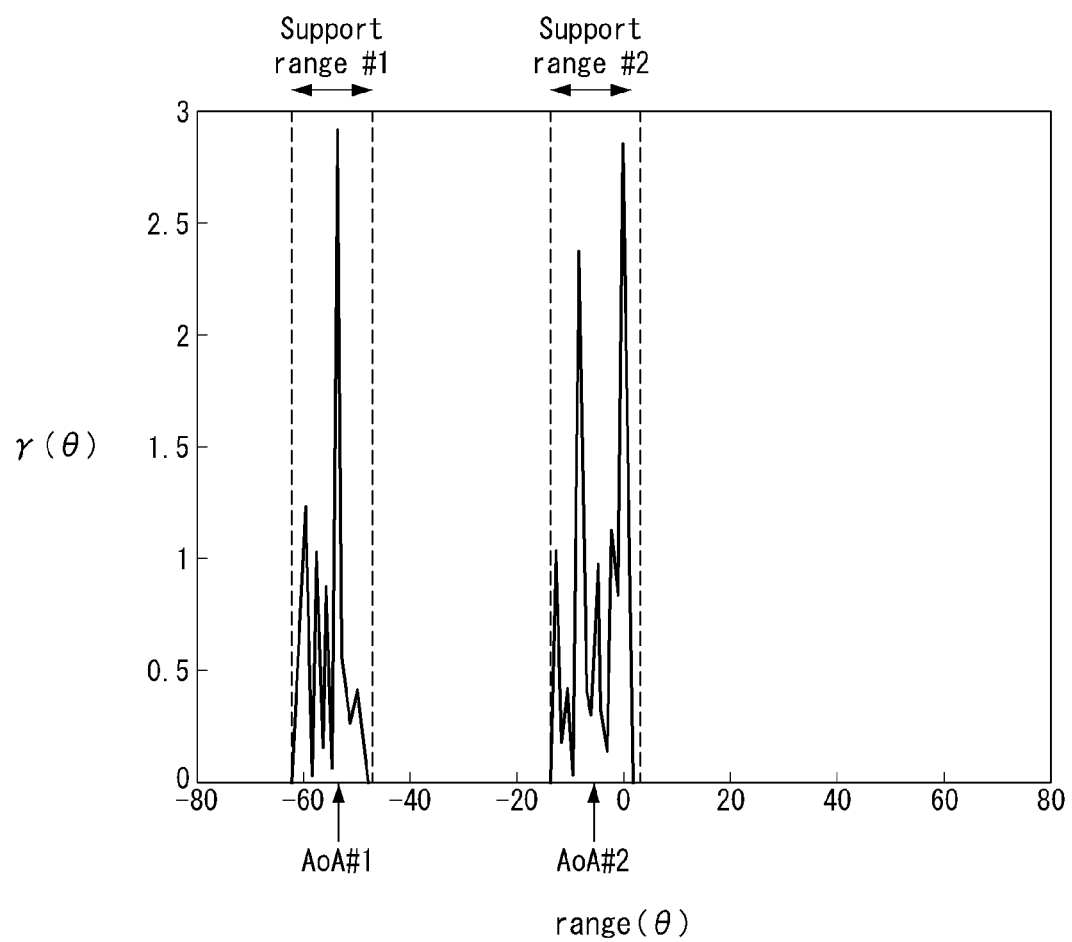

[Figure 8]
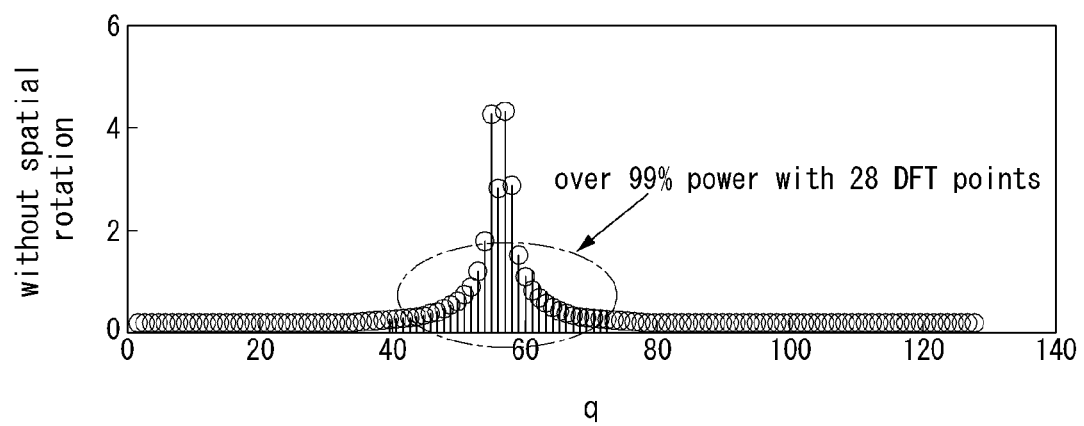
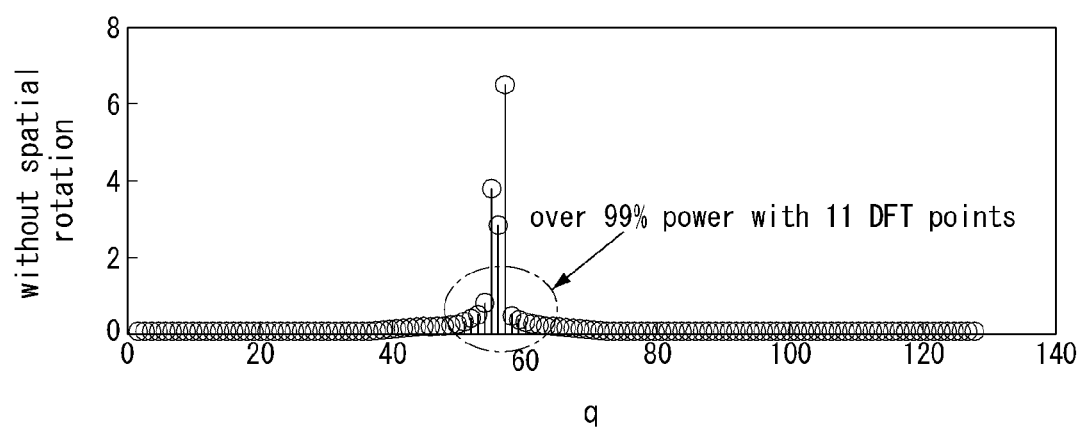

[Figure 9]
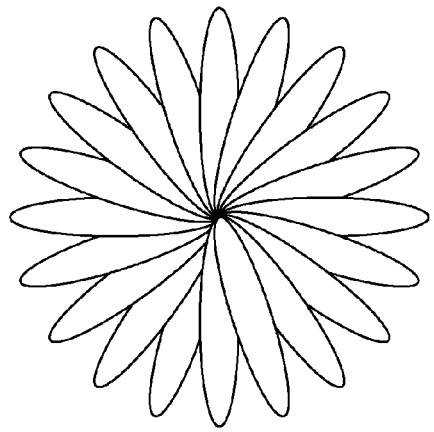
DFT-beam set
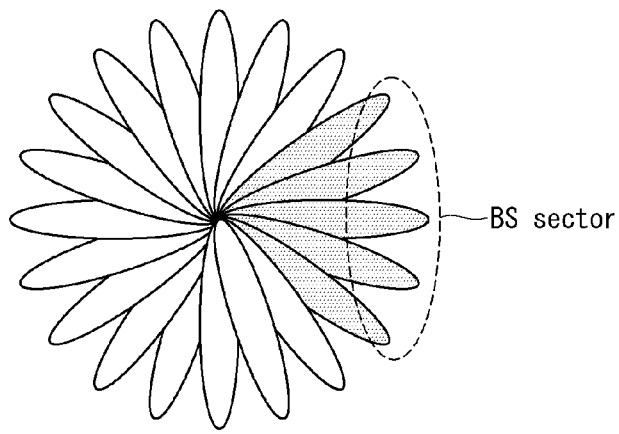
Sectorized DFT-beam set
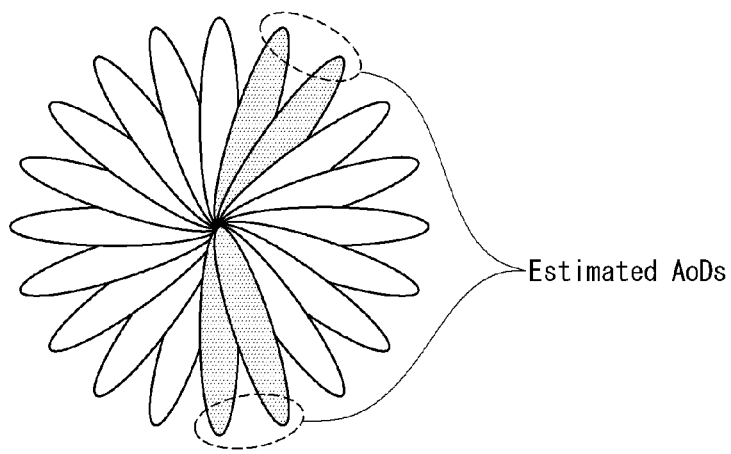
DFT-beam set
based on UL/DL angular property

[Figure 10]
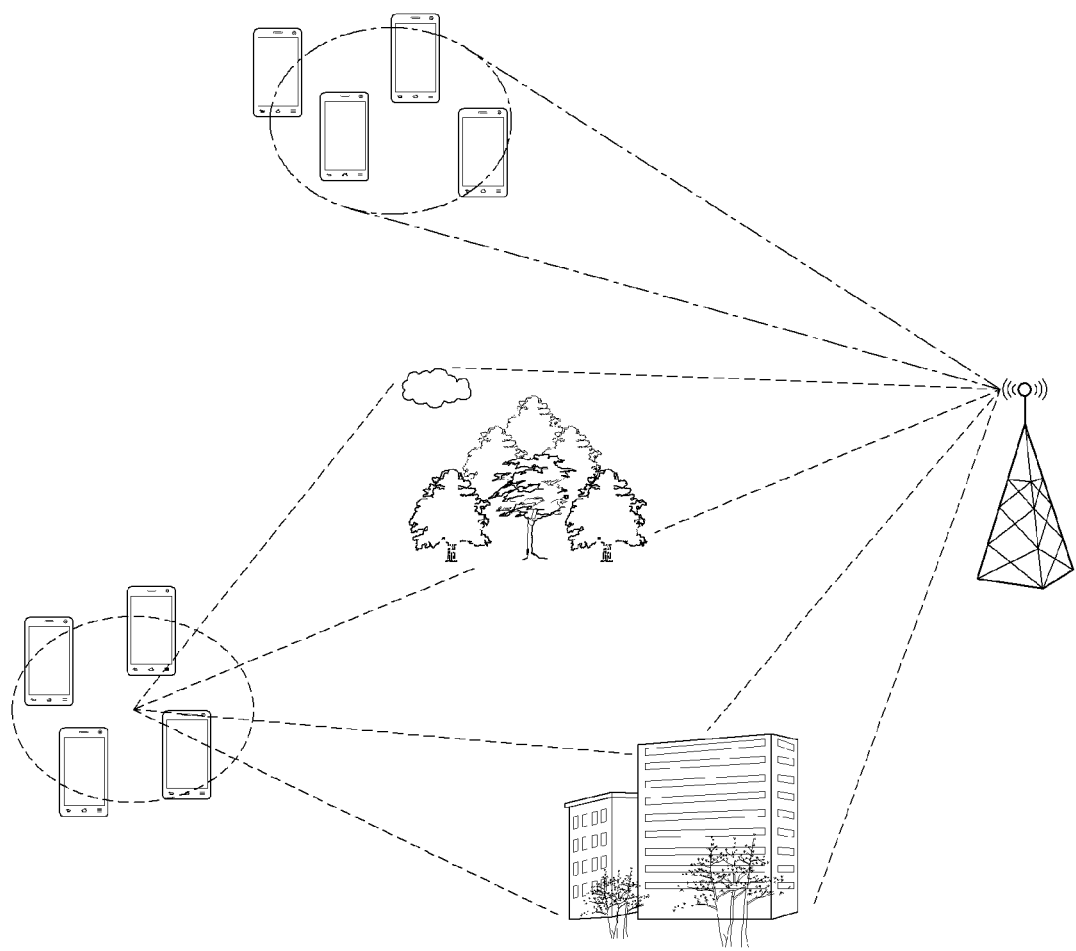

[Figure 11]
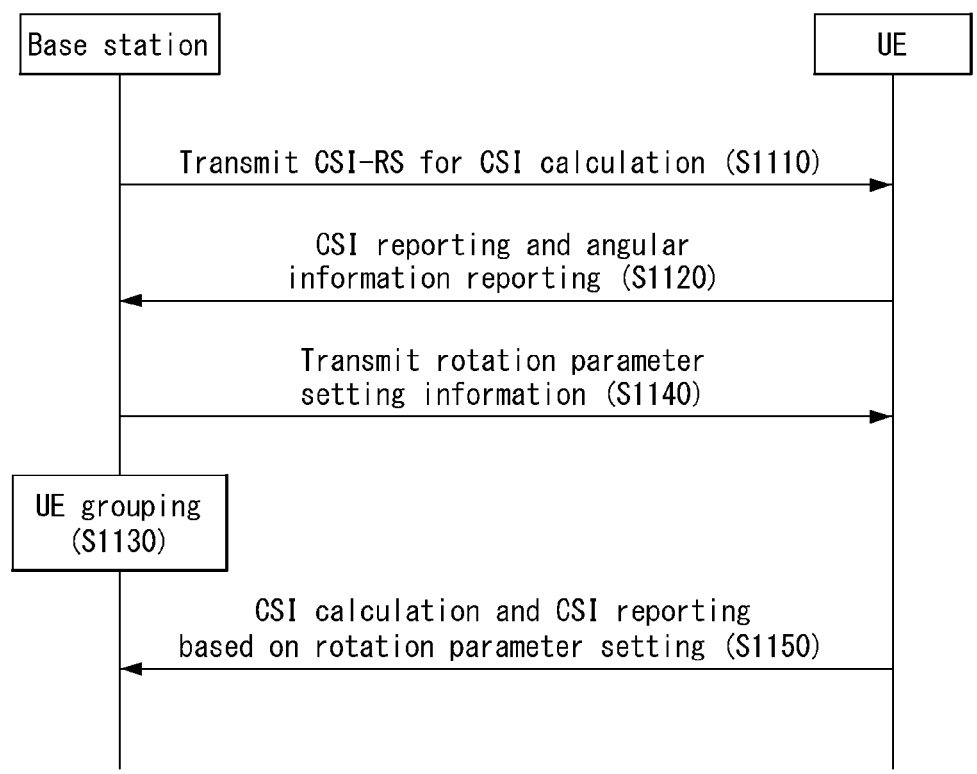

[Figure 12]
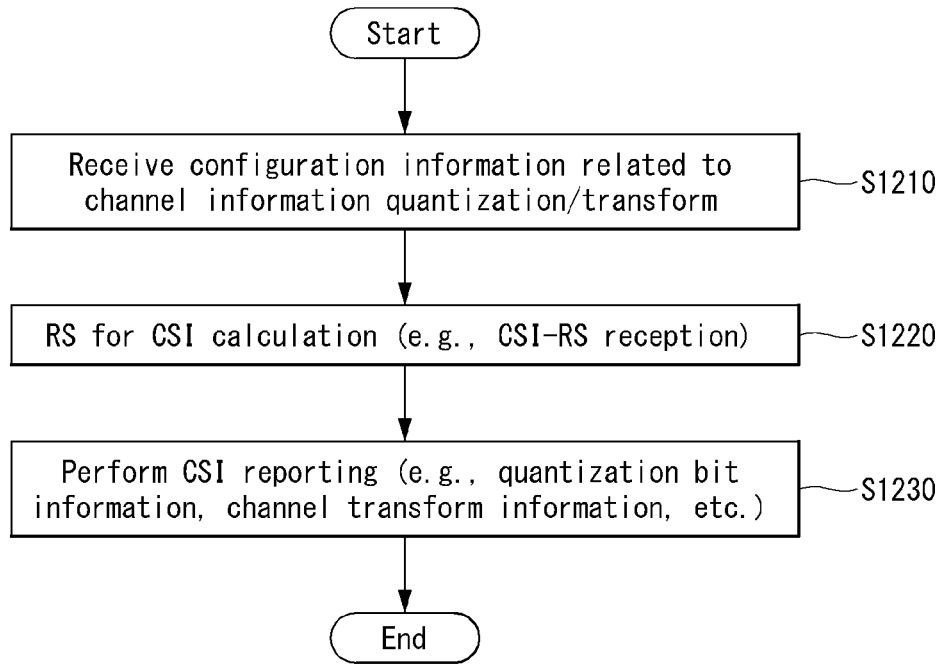
[Figure 13]
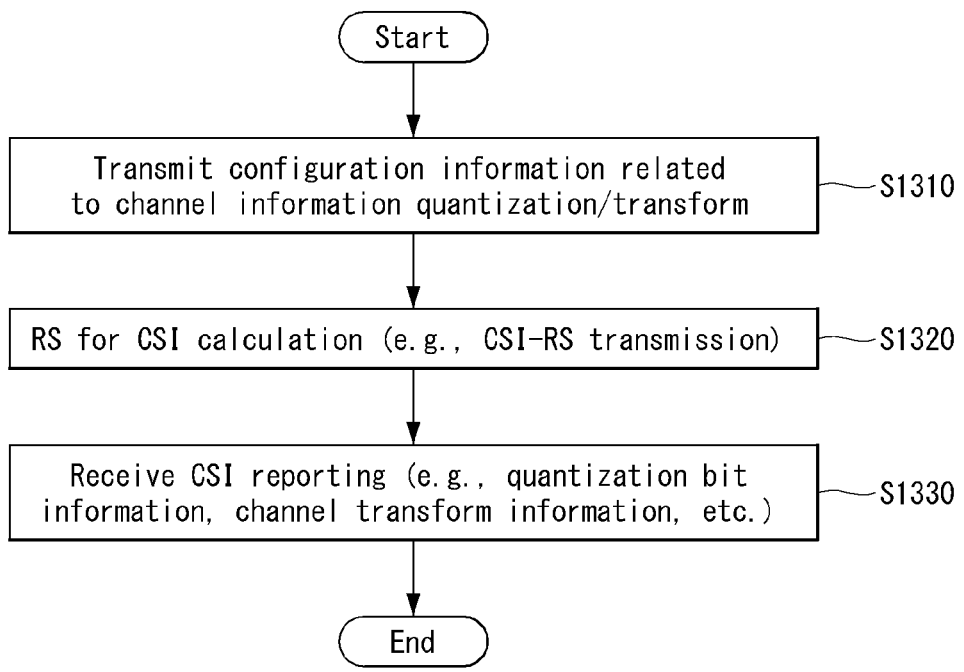

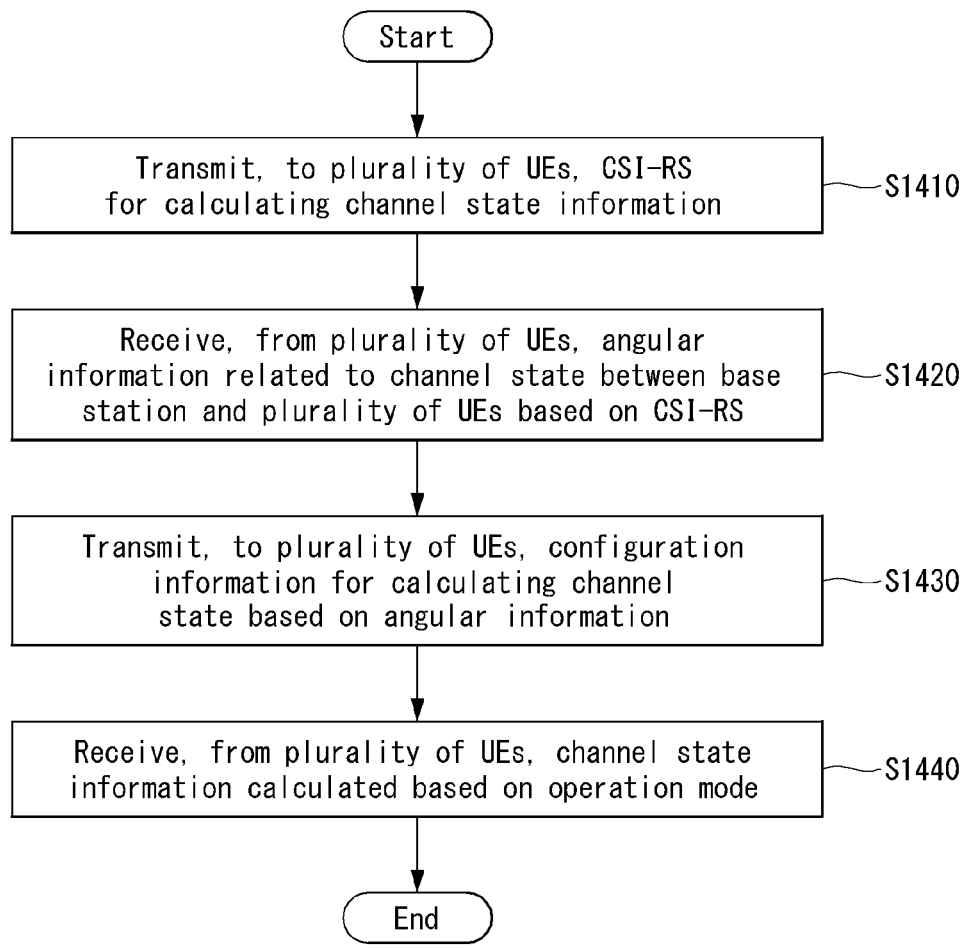

[Figure 15]
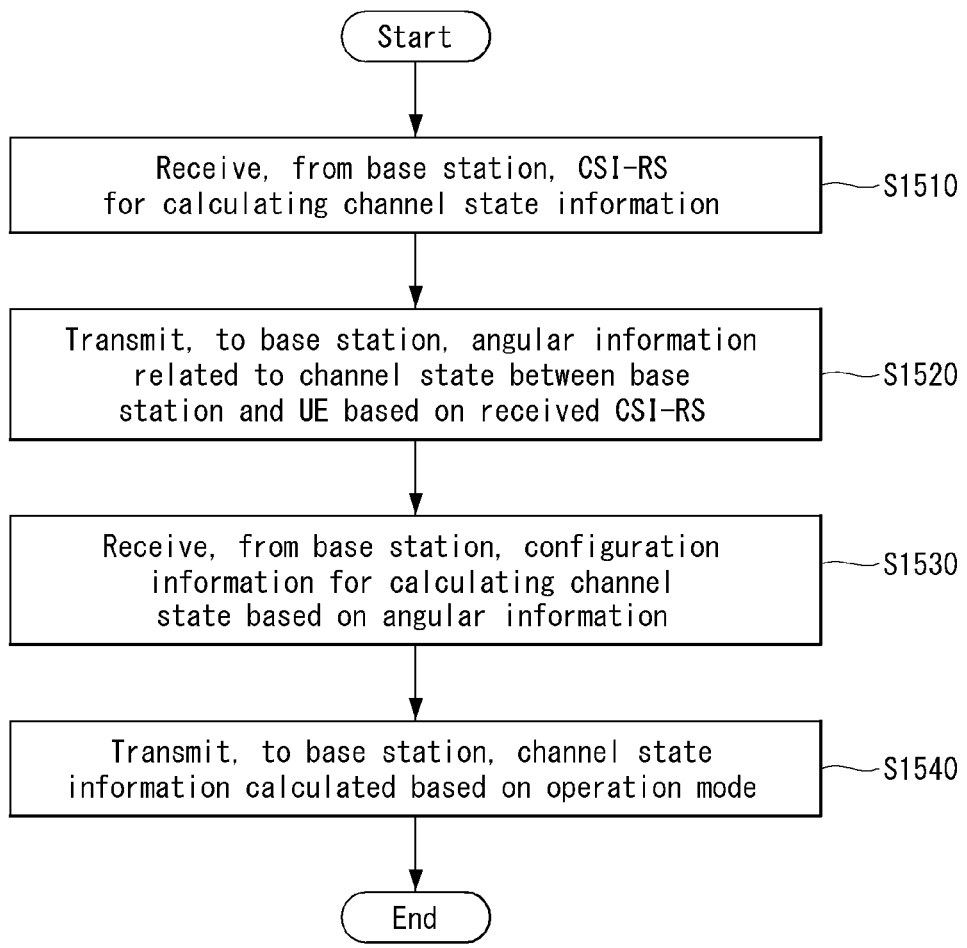

[Figure 16]
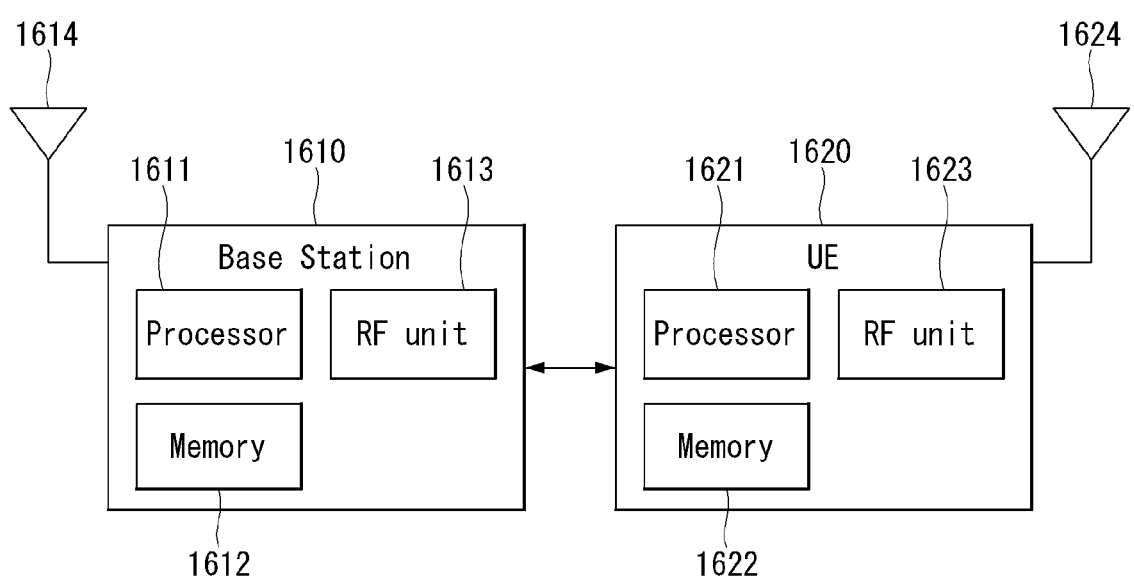

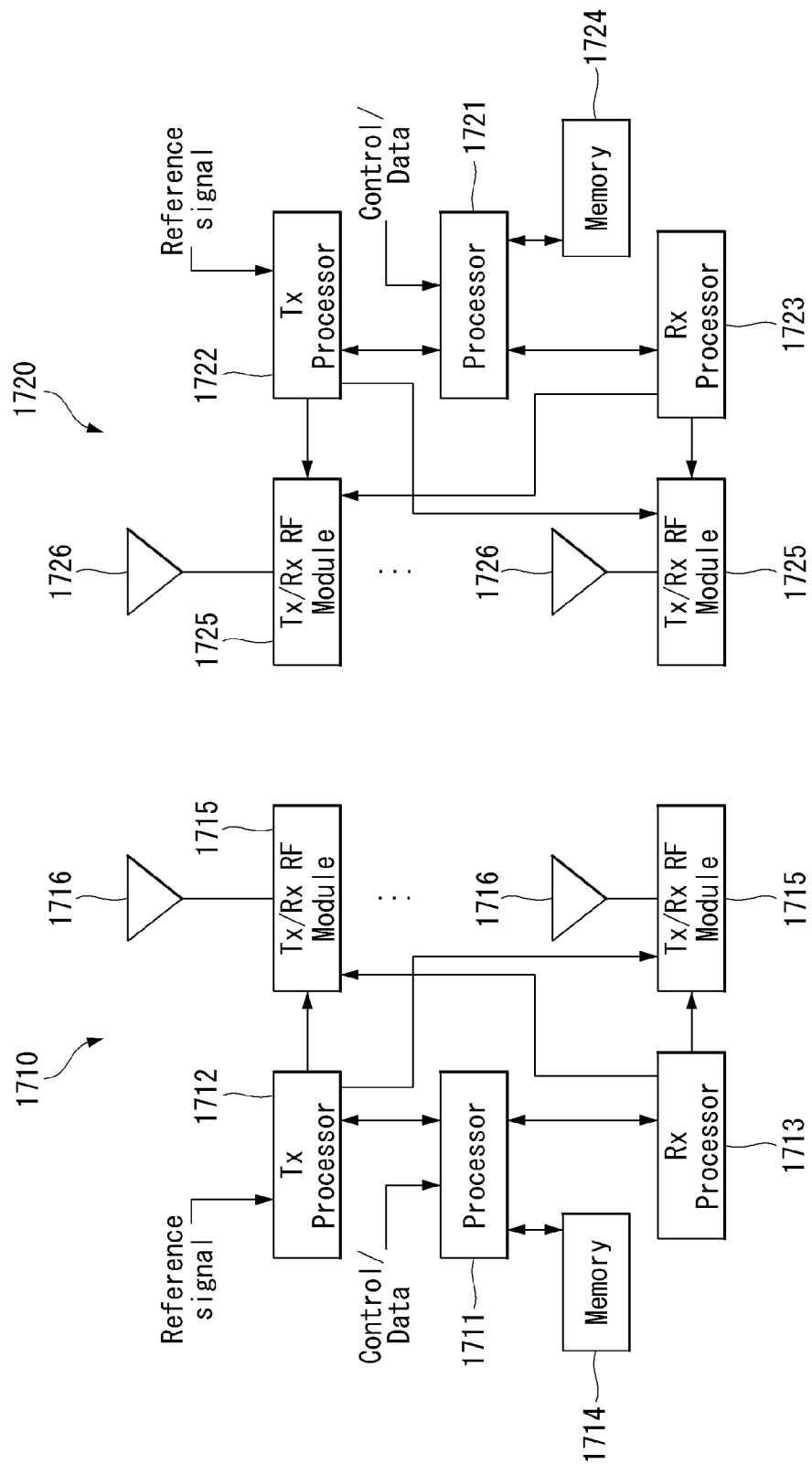
[Figure 17]

【Figure 18】
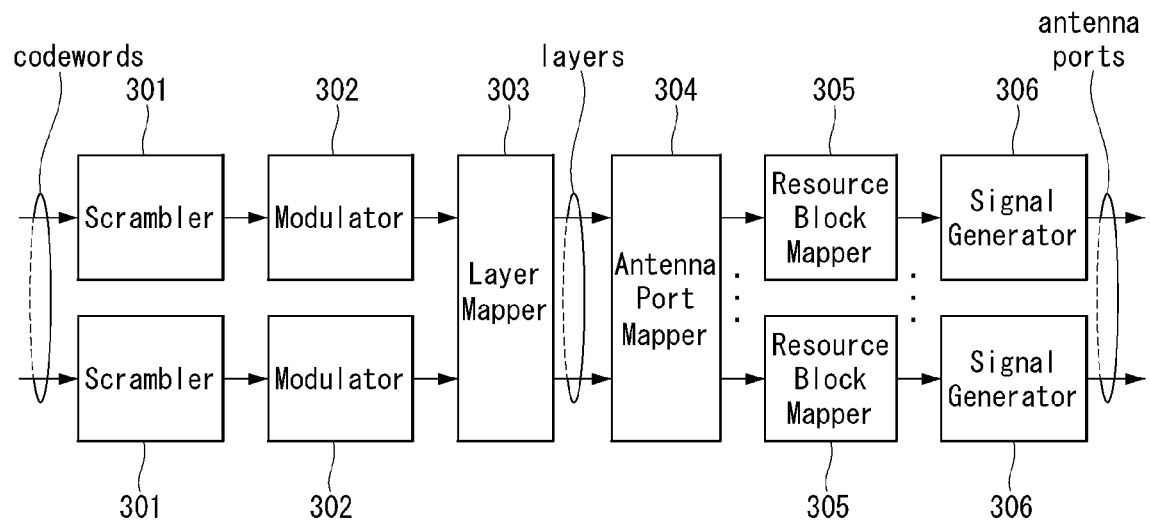
【Figure 19】
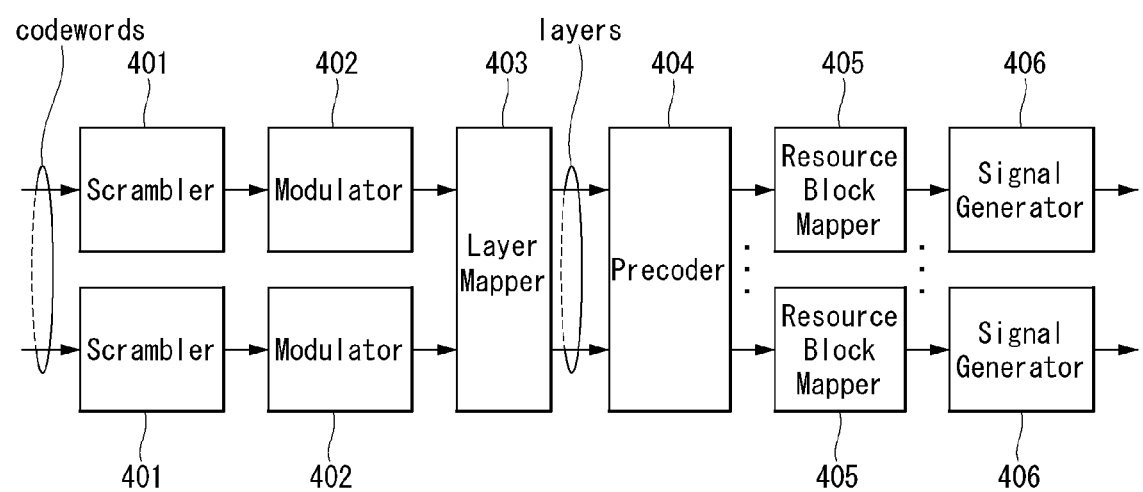

METHOD FOR TRANSMITTING AND RECEIVING CHANNEL STATE INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/003905, filed on Apr. 2, 2019, which claims benefit of KR Application No. 10-2018-0037963, filed on Apr. 2, 2018, the contents of which are all hereby incorporated by reference herein in their entirety.

TECHNICAL FIELD

The present disclosure relates to a wireless communication system, and more particularly to a method for transmitting and receiving channel state information and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure provides a method for transmitting and receiving channel state information.

The present disclosure also provides a method for grouping a plurality of user equipments using angular information.

The technical problems to be solved by the present disclosure are not limited by the above-mentioned technical problems, and other technical problems which are not mentioned above can be clearly understood from the following description by those skilled in the art to which the present disclosure pertains.

Technical Solution

In one aspect, there is provided a method for a base station to receive channel state information in a wireless communication system.

More specifically, the method comprises transmitting, to a plurality of user equipments (UEs), CSI-RS for calculating the channel state information; receiving, from the plurality of UEs, angular information related to a channel state between the base station and the plurality of UEs based on the CSI-RS; transmitting, to the plurality of UEs, configuration information for calculating the channel state based on the angular information, the configuration information including information determining an operation mode of the plurality of UEs; and receiving, from the plurality of UEs, the channel state information calculated based on the operation mode.

The angular information includes at least one of a signal direction, an angular spread, a spatial rotation parameter, a number of beams of a transformation matrix, and an index of the transformation matrix.

The angular information is received in one of periodic, aperiodic, and semi-persistent transmission types.

The method further comprises, before transmitting to the plurality of UEs the configuration information for calculating the channel state based on the angular information, grouping the plurality of UEs based on the angular information.

The plurality of grouped UEs is configured to be divided into a representative UE and a sub-UE.

The representative UE and the sub-UE are determined based on unique indexes of the plurality of grouped UEs, or determined by a pre-configured criterion.

The representative UE and the sub-UE are determined based on the operation mode. A UE is configured as the representative UE when the operation mode is 'ON', and a UE is configured as the sub-UE when the operation mode is 'OFF'.

Receiving the channel state information calculated based on the operation mode comprises receiving only the channel state information of a UE configured as the representative UE.

In another aspect, there is provided a method for a user equipment (UE) to transmit channel state information in a wireless communication system, the method comprising receiving, from a base station, CSI-RS for calculating the channel state information; transmitting, to the base station, angular information related to a channel state between the base station and the UE based on the received CSI-RS; receiving, from the base station, configuration information for calculating a channel state based on the angular information, the configuration information including information determining an operation mode of the UE; and transmitting, to the base station, the channel state information calculated based on the operation mode.

The UE is configured as a representative UE when the operation mode is 'ON', and the UE is configured as a sub-UE when the operation mode is 'OFF'.

The method further comprises, when the operation mode is 'ON', transmitting, to the base station, at least one of a number of beams of a transformation matrix, a beam index of the transformation matrix, a spatial rotation parameter, and a coefficient of a channel to which the spatial rotation parameter is applied.

Transmitting the channel state information calculated based on the operation mode comprises transmitting the channel state information of the UE only when the UE is configured as the representative UE.

In another aspect, there is provided a base station receiving channel state information in a wireless communication system, the base station comprising a radio frequency (RF) module configured to transmit and receive a radio signal; and a processor functionally connected to the RF module, wherein the processor is configured to transmit, to a plurality of user equipments (UEs), CSI-RS for measuring the channel state information; receive, from the plurality of UEs, angular information related to a channel state between the base station and the plurality of UEs based on the CSI-RS; transmit, to the plurality of UEs, configuration information for measuring the channel state based on the angular information, the configuration information including information determining an operation mode of the plurality of UEs; and receive, from the plurality of UEs, the channel state information calculated based on the operation mode.

The processor is configured to group the plurality of UEs based on the angular information.

The plurality of grouped UEs is configured to be divided into a representative UE and a sub-UE. The processor is configured to receive only the channel state information of a UE configured as the representative UE.

Advantageous Effects

The present disclosure has an effect capable of efficiently transmitting and receiving channel state information by providing a method for transmitting and receiving the channel state information.

The present disclosure also has an effect capable of efficiently transmitting and receiving channel state information by providing a method for grouping UEs.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 illustrates an example of an overall structure of a new radio (NR) system according to some implementations of the present disclosure.

FIG. 2 illustrates an example of a relationship between an uplink (UL) frame and a downlink (DL) frame in a wireless communication system according to some implementations of the present disclosure.

FIG. 3 illustrates an example of a resource grid supported in a wireless communication system to which a method described in the present disclosure is applicable.

FIG. 4 illustrates examples of a resource grid per antenna port and numerology to which a method described in the present disclosure is applicable.

FIG. 5 illustrates an example of a self-contained slot structure to which a method described in the present disclosure is applicable.

FIG. 6 illustrates an example of a magnitude of an angular domain for each element of a covariance matrix for a DL channel.

FIG. 7 illustrates an example of magnitudes of azimuth angle of arrival (AoA) and energy for an UL channel.

FIG. 8 illustrates an example of a channel sparsity effect applying spatial rotation and DFT operation, to which an embodiment described in the present disclosure is applicable.

FIG. 9 illustrates an example of a method of determining a DFT beam according to UE support feature of a base station.

FIG. 10 illustrates an example of a massive MIMO base station in a finite scattering environment.

FIG. 11 illustrates a flow between a UE and a base station for CSI reporting described in the present disclosure and a corresponding signalling.

FIG. 12 illustrates an example of a UE operation to which a method of reporting CSI described in the present disclosure is applicable.

FIG. 13 illustrates an example of a base station operation to which a method of receiving CSI described in the present disclosure is applicable.

FIG. 14 is a flow chart illustrating an operation method of a base station performing a method of receiving CSI described in the present disclosure.

FIG. 15 is a flow chart illustrating an operation method of a UE performing a method of receiving CSI described in the present disclosure.

FIG. 16 illustrates a block configuration diagram of a wireless communication device to which methods described in the present disclosure are applicable.

FIG. 17 illustrates another example of a block configuration diagram of a wireless communication device to which methods described in the present disclosure are applicable.

FIG. 18 illustrates another example of a block configuration diagram of a wireless communication device to which methods described in the present disclosure are applicable.

FIG. 19 illustrates another example of a block configuration diagram of a wireless communication device to which methods described in the present disclosure are applicable.

DISCLOSURE

Some implementations of the present disclosure are described in detail with reference to the accompanying drawings. A detailed description to be disclosed along with the accompanying drawings is intended to describe some exemplary implementations of the present disclosure and is not intended to describe a sole implementation of the present disclosure. The following detailed description includes more details in order to provide full understanding of the present disclosure. However, those skilled in the art will understand that the present disclosure may be implemented without such more details.

In some cases, in order to prevent a concept of the present disclosure from being ambiguous, known structures and devices may be omitted or illustrated in a block diagram format based on core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

5G new radio (NR) defines enhanced mobile broadband (eMBB), massive machine type communications (mMTC), ultra-reliable and low latency communications (URLLC), and vehicle-to-everything (V2X) based on usage scenario.

5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by the standard documents disclosed in at least one of IEEE 802, 3GPP, and 3GPP2 which are radio access systems. That is, steps or parts, in embodiments of the present disclosure, which are not described to clearly show the technical spirit of the present disclosure can be supported by the standard documents. Further, all terms disclosed in the present disclosure can be described by the standard documents.

In order to clarify the description, embodiments are described focusing on 3GPP LTE/LTE-A/NR (New Radio), but the technical features of the present disclosure are not limited thereto.

In the present disclosure, 'A and/or B' can be interpreted in the same sense as 'including at least one of A or B'.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

Numerology: The numerology corresponds to one sub-carrier spacing in a frequency domain. By scaling a reference subcarrier spacing by an integer N, different numerologies can be defined.

NR: NR Radio Access or New Radio

General System

FIG. 1 illustrates an example of an overall structure of a new radio (NR) system according to some implementations of the present disclosure.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |

TABLE 1-continued

| $\mu$ | $\Delta f = 2^\mu \cdot 15$ [kHz] | Cyclic prefix |
|---|---|---|
| 3 | 120 | Normal |
| 4 | 240 | Normal |
| 5 | 480 | Normal |

With regard to the frame structure in the NR system, the size of various fields in the time domain is expressed as a multiple of a time unit of $T_s=1/(\Delta f_{max} \cdot N_f)$, where $\Delta f_{max}=480 \cdot 10^3$ and $N_f=4096$ Downlink and uplink transmissions are constituted of a radio frame with a period of $T_f=(\Delta f_{max} N_f/100) \cdot T_s=10$ ms. The radio frame is constituted of 10 subframes, each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology $\mu$, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number of OFDM symbols per slot for a normal CP in the numerology $\mu$, and Table 3 represents the number of OFDM symbols per slot for an extended CP in the numerology $\mu$.

NR Physical Resource

With regard to physical resources in the NR system, an antenna port, a resource grid, a resource element, a resource block, a carrier part, etc. may be considered.

The above physical resources that can be considered in the NR system are described in more detail below.

First, with regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be considered as being in a quasi co-located or quasi co-location (QC/QCL) relationship. The large-scale properties include at least one of delay spread, Doppler spread, frequency shift, average received power, and received timing.

FIG. 3 illustrates an example of a resource grid supported in a wireless communication system to which a method described in the present disclosure is applicable.

Referring to FIG. 3, a resource grid consists of $N_{RB}^\mu N_{sc}^{RB}$ subcarriers on a frequency domain, each subframe consisting of $14 \cdot 2^\mu$ OFDM symbols, but the present disclosure is not limited thereto.

In the NR system, a transmitted signal is described by one or more resource grids consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 4, one resource grid may be configured per numerology $\mu$ and antenna port p.

FIG. 4 illustrates examples of a resource grid per antenna port and numerology to which a method described in the present disclosure is applicable.

Each element of the resource grid for the numerology $\mu$ and the antenna port p is called a resource element and is uniquely identified by an index pair (k,l), where k=0, . . . ,

TABLE 2

| | Slot Configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot Configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

$N_{RB}^\mu N_{sc}^{RB}-1$ is an index on a frequency domain, and $l=0, \ldots, 2^\mu N_{symb}^{(\mu)}-1$ refers to a location of a symbol in a subframe. The index pair (k,l) is used to refer to a resource element in a slot, where $l=0, \ldots, N_{symb}^\mu-1$.

The resource element (k,l) for the numerology $\mu$ and the antenna port p corresponds to a complex value $a_{k,l}^{(p,\mu)}$. When there is no risk for confusion or when a specific antenna port or numerology is not specified, the indices p and P may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain. On the frequency domain, physical resource blocks are numbered from 0 to $N_{RB}^\mu-1$. A relation between a physical resource block number $n_{PRB}$ on the frequency domain and the resource elements (k,l) is given by Equation 1.

$$n_{PRB} = \left\lfloor \frac{k}{N_{sc}^{RB}} \right\rfloor \quad \text{[Equation 1]}$$

In regard to a carrier part, a UE may be configured to receive or transmit the carrier part using only a subset of the resource grid. In this instance, a set of resource blocks which the UE is configured to receive or transmit are numbered from 0 to $N_{URB}^\mu-1$ on the frequency domain.

Self-Contained Slot Structure

In order to minimize data transmission latency in a TDD system, 5th generation (5G) new RAT (NR) considers a self-contained subframe structure as illustrated in FIG. 5.

That is, FIG. 5 illustrates an example of a self-contained structure to which a method described in the present disclosure is applicable.

In FIG. 5, a hatched portion 510 denotes a downlink control area, and a black portion 520 denotes an uplink control area.

A non-hatched portion 530 may be used for downlink data transmission or for uplink data transmission.

Such a structure is characterized in that DL transmission and UL transmission are sequentially performed in one slot, and the transmission of DL data and the transmission and reception of UL ACK/NACK can be performed in one slot.

The slot described above may be defined as 'self-contained slot'.

That is, based on such a slot structure, a base station can reduce the time it takes to retransmit data to a UE when a data transmission error occurs, and hence can minimize a latency of final data transfer.

In the self-contained slot structure, a time gap is necessary for the base station and the UE to switch from a transmission mode to a reception mode or to switch from the reception mode to the transmission mode.

To this end, some OFDM symbols at a time of switching from DL to UL in the self-contained slot structure are configured as a guard period (GP).

Explicit CSI Feedback

In the legacy communication system (e.g., LTE system), a closed-loop multi input multi output (MIMO) operation through implicit CSI feedback (i.e., implicit CSI reporting) has been performed. Additionally, in a next-generation mobile communication system (e.g., NR system), explicit CSI feedback (i.e., explicit CSI reporting) may be considered, which can enhance a performance of multi-user (MU)-MIMO based on more sophisticated channel information in a massive MIMO environment considering a large number of antennas in a base station side and a UE side.

The explicit CSI feedback may mean a scheme of quantizing channel information measured by the UE with high resolution and transmitting the quantized channel information to the base station. In this case, as shown in Table 4, the channel information may be classified into three types of information according to a transfer type of the channel, where N_T denotes the number of base station antenna ports, N_R denotes the number of UE antenna ports, and k denotes the number of dominant eigenvectors.

TABLE 4

- Channel information 1: Channel matrix $H \in C^{N_R \times N_T}$
- Channel information 2: Channel covariance matrix $H^H H \in C^{N_T \times N_T}$
- Channel information 3: Dominant eigenvector(s) $U_k \in C^{N_T \times k}$ and eigenvalue(s) where $H^H H = U\Sigma U^H$, $\Sigma = \text{diag}[\sigma_1^2, \sigma_2^2, \ldots \sigma_{N_T}^2]$, $\sigma_1^2 \geq \sigma_2^2 \ldots \geq \sigma_{N_T}^2$, $U = [u_1, u_2, \ldots, u_{N_T}]$ and $U_k = [u_1, u_2, \ldots, u_k]$ In the next-generation mobile communication system (e.g., NR system), an mmWave environment which is an ultra-high frequency band may also be considered in addition to massive MIMO. In such an environment, sparsity in an angular domain for channel information of transmitter and receiver ends tends to increase, and detailed contents thereof may be the same as FIG. 6 and the corresponding description. Hereinafter, in the present disclosure, sparsity may refer to property in which certain information appears densely in specific region(s).

FIG. 6 illustrates an example of a magnitude of an angular domain for each element of a covariance matrix for a DL channel.

Referring to FIG. 6, it is assumed that the number of transmission antenna ports of the base station is 128. It can be seen from FIG. 6 that valid information of a channel covariance matrix is densely distributed in a specific region.

In such a system environment, in all the three above-described schemes (i.e., channel information 1, channel information 2, and channel information 3), an amount of channel coefficients that the UE should feedback may increase depending on the number of base station antenna ports. An example of existing explicit CSI feedback scheme related to this may be as follows.

First, for the channel information 1, feedback for all elements corresponding to a channel matrix may be required.

For the channel information 2, feedback for all complex values of N_T×N_T may be required, and feedback may be required for $$\frac{N_T^2 + N_T}{2}$$

complex values even if considering Hermitian symmetry. In this instance, if a magnitude of the complex value is equal to or greater than a predetermined level, even in the case of a method of feeding back the corresponding value, feedback for location information and a complex value of the corresponding value may be required.

For the channel information 3, according to the value of k for selecting a dominant eigenvector, feedback for channel information elements as many as N_T×k may be required, and the computational complexity may increase to O(N_T^3) by a decomposition scheme of the UE.

In other words, the existing explicit CSI feedback schemes generate a very high feedback overhead in the massive MIMO environment, which leads to a reduction in system performance.

Accordingly, it is important that the explicit CSI feedback scheme transmits a high level of accurate channel information while efficiently reducing the feedback overhead.

The above purpose can be achieved by feeding back elements, that have a major influence on the accuracy of channel information not all elements of the channel information, via additional signaling between the UE and the base station capable of utilizing properties of channel.

UL-DL Angular Reciprocity in Frequency Division Duplexing (FDD)

Unlike time division duplexing (TDD), reciprocity for channel information cannot be guaranteed in FDD that uses different carrier frequencies for transmission and reception signals. However, due to properties of the ultra-high frequency band, there may be reciprocity in an angular domain for the transmission and reception signals.

The angular reciprocity may mean that a path or an angle and an angular spread of uplink (UL)/downlink (DL) signal are the same as those of downlink (DL)/uplink (UL) signal. This may be established even in an FDD environment in which a difference between a carrier frequency in UL and DL is several GHz.

Accordingly, angular property of the DL/UL can be calculated through angular information obtained through the UL/DL signal, and the number of instantaneous channel gains that the UE should feedback can be greatly reduced using the calculated angular property. As an example, the properties of the UL channel may be the same as FIG. 7.

FIG. 7 illustrates an example of magnitudes of azimuth angle of arrival (AoA) and energy for an UL channel.

Referring to FIG. 7, it can be seen that valid information of channel is concentrated in a limited support region for a specific number of AoAs. Based on the properties, azimuth angle of departure (AoD) of the base station and a range of the corresponding support region may be estimated based on |f_UL−f_DL| which is a difference value between the carrier frequencies, which may be referred to as UL-DL angular reciprocity. Thus, for locations and regions having valid complex values of a DL channel covariance matrix, AoD through a power-angle spectrum and a range of the corresponding support region may have a high correlation with each other.

Enhanced Channel Sparsity with Spatial Rotation

In a method described in the present disclosure, a UE and/or a base station can greatly reduce a feedback overhead for acquiring channel information in DL by utilizing low-rank property of the channel information based on sparsity of a massive MIMO radio channel environment.

In order to perform this, it may be required to estimate and utilize angular information of channel corresponding to low-rank. A scheme such as existing multiple signal classification (MUSIC), estimation of signal parameters via rotational invariance technique (ESPRIT), etc., has limitations in that high complexity is caused in a massive antenna environment and properties of incoming signals are not properly reflected.

Accordingly, the angular information in the massive MIMO environment can be efficiently acquired and utilized for channel estimation by performing signal processing and DFT operation based on an antenna array. Here, (p, q)-th element of DFT matrix F may be constructed as follows.

$$[F]_{p,q} = \frac{1}{\sqrt{N_T}} e^{-j\frac{2\pi}{N_T}(p-1)(q-1)} \text{ for } p, q = 1, \cdots, N_T \quad \text{[Equation 2]}$$

In Equation 2, N_T denotes the number of antenna ports of a transmitting device (e.g., base station).

That is, a resolution of DFT can be greatly enhanced due to a massive antenna configuration (e.g., N_T»1) of a transmitter end, and an angle and an angular spread of signal can be estimated with relatively high accuracy through the DFT operation.

For example, in a ULA environment, the DFT operation converts channel information into sub-channels consisting of regular intervals in an entire beam-space. In this instance, points (or positions) having non-zero values may be construed as the angular spread centering on specific direction of arrival (DoA) of the channel. In a wireless environment considered in the present disclosure, it is assumed that the number of sub-channels is limited, and the sub-channels show in the form of dense and sparse.

On the other hand, in terms of practical implementation, the number of antennas of the transmitter end is finite, which may limit a resolution of the DFT. In this case, power for each sub-channel may lead to a leak to the adjacent sub-channel, and thus the number of sub-channels with non-zero power may increase compared to when the resolution of the DFT is high. This weakens the sparsity of the channel and may also be a cause giving a burden on channel information feedback of the UE.

Considering such a point, a method may be considered, which reduces a power leak of sub-channels by performing a spatial rotation of a radio channel to thereby align directions of sub-channels and incoming signals with higher accuracy.

For example, a sparsity effect of the channel through the spatial rotation and DFT operation may be the same as FIG. 7.

FIG. 8 illustrates an example of a channel sparsity effect applying spatial rotation and DFT operation, to which an embodiment described in the present disclosure is applicable. FIG. 8 is merely for convenience of description and does not limit the scope of the present disclosure.

Referring to FIG. 8, while 28 sub-channels are used to represent channel information in the existing DFT operation, 11 sub-channels may be used when the spatial rotation is additionally performed.

As described above, sparsity may refer to property in which certain information appears densely in specific region(s).

'channel sparsity' used in the present disclosure may refer to a value representing a degree to which valid values exist (or a density of valid values among all values).

The UE and the base station in a next-generation mobile communication system have considered massive MIMO supporting a large number of antennas.

Accordingly, the following description of the present disclosure proposes a scheme for efficient explicit CSI feedback by utilizing uplink (UL)/downlink (DL) angular reciprocity relationship of the UE and the base station in a massive MIMO situation.

The above-described explicit CSI feedback schemes increase the feedback overhead for acquiring accurate channel information as the number of antenna ports of the UE or the base station increases. In addition, the explicit CSI feedback schemes can utilize reciprocity for channel information of the UL and DL in a TDD environment, but has a problem in that each link has different channel information in the FDD.

Accordingly, the present disclosure proposes an explicit CSI reporting scheme and a signaling procedure capable of achieving the above-described purposes by considering the properties according to the base station for an ultra-high frequency massive MIMO wireless communication environment and utilizing channel sparsity for channel information with the UE.

That is, the base station may support the UE using a beam of uniform shape covering the entire corresponding cell and may be based on a beam corresponding to a specific sector.

In the present disclosure, channel information will be described using a covariance matrix, but can be extended to other channel types.

(Method 1)

First, a UE may receive, from a base station, a reference signal CSI-RS required to measure channel state information.

The UE reports a portion or all of radio channel angular information to the base station using the CSI-RS received from the base station.

In this instance, the radio channel angular information is as below.

The radio channel angular information: i) reporting mode for angular information), ii) reporting period for angular information, iii) angular information More specifically, i) reporting mode for angular information may explicitly configure a subset of iii) angular information or follow a pre-defined rule when angular information is reported.

ii) Reporting period for angular information may include periodic, aperiodic, and/or semi-persistent transmission types.

iii) Angular information may include signal direction(s), angular spread(s), spatial rotation parameter, and/or the number of beams and information for corresponding index of a transformation matrix (e.g., DFT, pre-defined basis).

More specifically, channel sparsity may refer to property that meaningful values of channel information are concentrated in a specific angular domain or a specific region of a channel covariance matrix according to a wireless environment considered in the present disclosure.

In this instance, meaningful channel information may mean that a size of a corresponding channel information element is equal to or greater than a specific reference value.

Accordingly, if the base station and the UE figure out a method of estimating the channel and the angular property and perform signalling of channel information having meaningful values and parameters not all the channel information, the base station and the UE can estimate channel information with a high level of accuracy while reducing the feedback overhead.

Since valid values of the channel information are affected by properties of a transformation matrix (e.g., discrete Fourier transform (DFT), orthogonal basis) for an actual channel matrix, the base station and the UE may be indicated/configured to share information for the transformation matrix with each other.

Alternatively, the transformation matrix may use a pre-defined matrix.

As an example of applying the transformation matrix, a matrix $\bar{X}$ transformed by multiplying transformation matrices T1 and T2 for a channel information matrix X (M×K) is expressed by $\bar{X} = T_1^H X T_2$.

In this instance, the size of the multiplied transformation matrix may depend on the size of X.

For example, there may be the transformation matrix T1 (e.g., DFT matrix) of M by M and the transformation matrix T2 (e.g., DFT matrix) of M by M.

Operations of CSI feedback may be divided according to the method indicated by the base station or the UE based on channel information transformed via transformation matrix information.

Besides, as described above, characteristics of the channel information estimation in the massive MIMO environment is determined by a main angle of a signal path using RS between the base station and the UE and angular spread corresponding to it.

Thus, a transformation matrix can be constructed by extracting a specific column of a transformation matrix aligned in a direction similar to angular information for the signal between the base station and the UE That is, upon construction of actual channel information, the present disclosure is to transmit channel information with more concise and high accuracy by extracting, as angular information, property of a main direction for a signal intensity using low-rank property according to channel sparsity and applying a restriction to a subset for the transformation matrix.

In order to estimate channel information with high accuracy, it is necessary to accurately reflect a path and angular spread property of a signal between the base station and the UE.

Even if a large number of antennas are provided, there may cause an error from the actual direction of the radio channel due to finite beam directions expressed by the DFT matrix.

Therefore, in order to compensate the error, it is necessary to improve channel sparsity by performing DFT operation F and a spatial rotation operation to thereby achieve the more accurate angle estimation and reduce the size of angular spread.

Channel information applying the DFT operation and the spatial rotation is given by Equation 3.

$$h_k = F \bar{h}_k = \sum_{i=1}^{S} \beta_{k,i} \Phi(\phi_k) a(\theta_{k,i}) \quad \text{[Equation 3]}$$

In Equation 3, $\beta_{k,i}$ denotes a complex gain of a corresponding sub-channel, $\Phi(\phi_k) = \text{diag}\{[1, e^{j\phi_k}, \ldots, e^{j(N_T-1)\phi_k}]\}$ denotes a spatial rotation matrix, and $$\phi_k \in \left[-\frac{\pi}{N_T}, \frac{\pi}{N_T}\right]$$

denotes a spatial rotation parameter.

In this instance, $a(\theta)$ is an array manifold vector and is affected by an antenna structure.

In particular, in case of uniform linear array (ULA), $a(\theta)$ is as the following Equation 4.

$$a(\theta) = \left[1, e^{j\frac{2\pi d}{\lambda}\sin\theta}, \ldots, e^{j\frac{2\pi d}{\lambda}(N_T-1)\sin\theta}\right]^T \quad \text{[Equation 4]}$$

In Equation 4, d denotes a distance between antennas, and $\lambda$ denotes a wavelength of signal.

Further, S vectors $a(\theta_{k,i})$ denote sub-channels in a beam-space and are orthogonal to each other. For example, in an ULA environment, $a(\theta_{k,i})$ may correspond to a specific column of the DFT matrix (Method 1-1)

According to Method 1-1, the base station includes one or more of the followings in downlink CSI feedback configuration information to be configured to the UE.

More specifically, the base station may include one or more of i) base station beam indices according to angular information ii) UE configuration information using angular information, iii) UE grouping information, and iv) CSI reporting payload size information.

i) base station beam indices according to angular information may include index information for each beam.

ii) UE configuration information using angular information may include information for a CSI reporting mode and/or a CSI reporting period.

iii) UE grouping information may include a UE group configuration indicator, a UE group representative space rotation parameter, UE group representative beam number and corresponding indices, differential beam index information, and/or information for differential space rotation parameter.

iv) CSI reporting payload size information may include may include information for a size of payload for CSI reporting.

As described above, upon construction of a transformation matrix for channel sparsity, it is possible to reduce a size of a beam set of the transformation matrix considering beam property of the base station.

FIG. 9 illustrates an example of a method of determining a DFT beam according to UE support feature of a base station.

As illustrated in FIG. 9, if a transformation matrix is assumed to be a DFT matrix, a method of determining a DFT beam using angular property of the base station and the UE may be used.

Based on a DFT matrix configuring a beam set considering all the directions in a horizontal domain based on the base station, when there is a specific sector in which the base station supports the UE, consecutive beam sets can be used by utilizing an angle coverage covered by the corresponding sector.

That is, if a direction of a beam of the base station in an angular domain is 60°, and a beam coverage is 0 to 120°, columns corresponding to the above condition among DFT beams may be selected and configured to the base station and the UE.

Before utilizing the above information, the number of beams configured to the base station may be uniformly distributed based on a range of a sector that should be covered.

Further, the base station may obtain angular information of UEs and may allocate the UE the same beam of a high resolution orientated to a specific angle.

By utilizing angular spread for a specific angle, a beam may be configured with a high resolution in the corresponding region and configured with a low resolution in remaining regions.

When CSI reporting is performed using the angular information, there is an effect capable of increasing the accuracy of beam by selectively configuring columns of a specific DFT based on a signal path and angular spread information of the base station and the UE using UL/DL angular property.

That is, the base station and the UE do not share a transformation matrix ($N_T \times N_T$) corresponding to the number of antennas of the base station, and may signal only k ($1 \leq k \ll N_T$) column indices for a pre-shared transformation matrix to configure channel information using a transformation matrix of ($N_T \times k$).

In such a case, as a size of a channel covariance matrix is greatly reduced to ($k \times k$), there is an effect capable of expressing the channel with high accuracy.

The transformed channel covariance matrix may sequentially report channel coefficients expressed in complex numbers according to Hermitian properties.

Quantization information of valid channel coefficients may map a complex value, that is an element of a channel matrix, to a specific value in a two-dimensional (2D) domain of real/imaginary numbers and then may transform it into an index corresponding to it.

In this instance, a degree of quantization of the mapping value may be adjusted according to the order of signal intensity, etc.

A complex value is transformed by finding a magnitude and an angle of the complex value and then quantizing each of the magnitude and the angle, and a degree of quantization of the magnitude and the angle may be adjusted according to specific criteria.

For example, if the number of bits assigned to quantization of one complex value is 10, 5 bits may be equally assigned to each of a magnitude and an angle or a magnitude and an angle may be set at a ratio of 7:3.

Alternatively, if there is only a real value, a maximum magnitude of a corresponding element may be quantized as only a real value.

In payload information for CSI feedback, in a situation in which payload for CSI reporting is fixed by a system operation, the number of selecting columns of a transformation matrix, whether there is a spatial rotation parameter, and a resolution have a correlation in feeding back valid coefficients of channel information.

Further, each element can be selectively applied according to configuration of the UE or the base station, and thus a resolution of a spatial rotation parameter can be variously used.

A detailed description thereof will be given through Method (1-2).

In the base station supporting the UE, the highest accuracy is obtained when each UE performs CSI feedback by optimizing a beam direction and a spatial rotation parameter.

However, there is a problem in that overhead according to this is increased.

In particular, beam property of the base station and angular information between the base station and the UE based on channel sparsity of the above-described wireless environment may be considered as illustrated in FIG. 10.

FIG. 10 illustrates an example of a massive MIMO base station in a finite scattering environment.

That is, radio channels of several UEs share common property by specific cluster and beam.

Thus, the base station may estimate angular information for each UE through the RS and then group UEs with angular property similar to a beam supported by the base station.

If the base station groups the UEs using the angular information, there is an effect capable of configuring the UEs at once without estimating and reporting a main beam index and a spatial rotation parameter of a transformation matrix for each UE.

Alternatively, if only one representative UE of the corresponding group reports basis information and a spatial rotation parameter to the base station during a specific period T, and in this case, if there is a great change in the beam or a great change in the spatial rotation parameter, the base station may report it to sub-UEs using differential method and apply it as an efficient trade-off solution for payload and radio channel estimation performance.

The UE grouping is described below.

UE Grouping and Operation Division Method

In a step of starting the grouping of UEs, a base station may obtain angular information from each of supported UEs and then perform a UE grouping operation according to a specific criterion (e.g., similar AoD or signal direction).

There may be a UE that does not obtain angular information at the same time or in the same period.

It may be assumed that the base station applies outdated angular information to the UE, that does not obtain angular information, or exclude the UE, that does not obtain angular information, from a grouping target UE.

The base station may perform the grouping of UEs through a pre-configured method based on information for a specific environment and whether there is mobility.

Further, when a period in which the grouping of UEs is maintained is T, the base station may expect that the UE reports angular information so that the base station can perform the grouping start operation at intervals of period T based on a time at which the UEs are grouped.

As described above, the base station needs to distinguish an operation of a representative UE representing a group from an operation of remaining UEs belongings to the group so that efficient CSI reporting for the group of the UEs can be performed.

As an example of distinguishing the operations, the base station may sort unique indexes of UEs in ascending/descending order and then designate a representative UE according to a specific method.

For example, indexes of four UEs configured as a group are [2, 19, 40, 7] within the base station, and the base station may sort the indexes in descending order and configure a first UE as a representative UE of the group.

In other words, the UE with the index [40] is the representative UE of the group, and the remaining UEs with the indexes [19, 7, 2] are sub-UEs.

As another example, the base station may distinguish a representative UE from sub-UEs based on a reporting mode of DCI.

A UE with a reporting mode 'ON' may be configured as the representative UE, and a UE with a reporting mode 'OFF' may be configured as the sub-UE.

The base station may designate a specific UE as the representative UE/sub-UE using RRC configuration, MAC-CE, etc. as flag information for representative UE/sub-UE indicators.

Alternatively, the base station may distinguish the operations of the UEs in the corresponding group not a method of representing the representative UE/sub-UE as separate states but an implicit method, for example, according to whether there is a state of reporting the spatial rotation parameter Next, reporting parameter setting operation and effect according to the operation distinguishment of the UEs in the group are described.

First, as described above, a case, in which the representative UE/sub-UE or parameter setting according to the reporting configuration for a group formed by a configured or pre-configured method are differently configured, is described.

a) Transmission information of a representative UE or a UE with rotation-parameter-reporting-mode='ON':

For the a), transmission information of the UE may include i) the number of beams and indexes of a transformation matrix (e.g., DFT matrix, orthogonal basis), ii) spatial rotation parameter, and/or iii) channel coefficient information to which the spatial rotation parameter is applied.

In this instance, the transmission information of the a) may be distinguished depending on that a transmission type is periodic, aperiodic, and semi-persistent.

For example, a limitation, in which a beam index and/or a spatial rotation parameter are transmitted in the aperiodic/semi-persistent type only when a change of the corresponding value is equal to or greater than a specific threshold in a specific section, and the like may be applied and used in the operation.

b) Transmission information of a sub-UE or a UE with rotation-parameter-reporting-mode='OFF':

For the b), transmission information of the UE may include channel coefficient information to which a parameter configured by the base station is applied.

The UEs that are not a representative UE in the corresponding group or are configured with reporting mode='OFF' may replace information, that the representative UE reports to the base station, by a beam index and spatial rotation information, that the corresponding UE first estimates.

Alternatively, the UE may configure channel information using a change value in a beam index and/or a spatial rotation parameter through the reporting of the differential method.

Accordingly, by distinguishing the operation of the representative UE from the operation of the sub-UEs and setting the reporting parameter, it is very efficient in terms of computational complexity of the UE, payload for channel coefficients, that should be actually reported, can also be adjusted due to the base station configuration information, and the property of channel sparsity can by efficiently reflected and calculated.

FIG. 11 illustrates a flow between a UE and a base station for CSI reporting described in the present disclosure and a corresponding signalling.

Referring to FIG. 11, FIG. 11 may be roughly divided into two configurations.

The two configurations may include a configuration in which the base station forms a UE group, and a configuration in which the UE transmits CSI depending on rotation parameter setting.

First, in a step of forming the UE group, the base station transmits, to the UE, a reference signal (e.g., CSI-RS) for CSI calculation in S1110.

The UE receiving the reference signal may measure channel state information using the reference signal and may report the corresponding channel state information to the base station.

And/or, the UE may measure angular information using the reference signal and may report the corresponding angular information to the base station in S1120.

In this instance, the angular information may include at least one of signal direction(s), angular spread(s), spatial rotation parameter, the number of beams of a transformation matrix (e.g., DFT, pre-defined basis), and a corresponding index.

The base station receiving the channel state information and the angular information may use the received channel state information and angular information, or may form the UE group based on the received channel state information and angular information in S1130.

Next, in a step in which the UE transmits CSI depending on the rotation parameter setting, the base station transmits rotation parameter setting information to the UE in S1140.

The UE receiving the setting information may measure channel state information based on the setting information and may report the corresponding channel state information to the base station in S1150.

For example, the UE may be determined as one of a representative UE and a sub-UE by the parameter setting information and may report the channel state information to the base station based on this.

In the above two configurations, the configuration in which the base station forms the UE group may precede the configuration, in which the UE transmits the CSI, depending on the parameter setting.

That is, the base station may form the UE group, and then a UE belonging to the UE group may transmit CSI according to the rotation parameter setting.

However, the step of forming the UE group does not have to necessarily precede, and the above two configurations may be performed independently.

(Method 1-2)

The UE receiving the above information from the base station utilizes one or more of CSI feedback configuration information and reports a portion or all of the following channel information to the base station.

In this instance, the channel information is as follows.

i) the number of beams and corresponding index of a transformation matrix, ii) spatial rotation parameter information, and/or iii) quantized/un-quantized channel coefficient(s).

As described above, the UE can secure sparsity of channel information in wireless conditions considered through the transformation matrix, and can transform and represent a channel covariance matrix into a low-dimensional matrix using characteristics representing a meaningful value in sparse channel information.

To this end, the UE may select a column indicating a beam direction of the transformation matrix using angular information capable of grasping beam property of the base station and property in an angular domain of the UE, and may report, to the base station, column indexes for a transformation matrix, that the base station and the UE simultaneously know, and the number of selected columns.

The UE may extract angular domain channel characteristics in DL using DL/UL RS, may use the extracted characteristics to calculate information for CSI feedback, and may report it to the base station.

The UE may use calculation and reporting of the spatial rotation parameter of the UE in a spatial rotation matrix, that the base station and the UE have previously promised, to restore actual channel information.

For example, before constituting a channel covariance matrix $C=h_k h_k^H$ that should be fed back using CSI-RS receiving from the UE, the base station previously sets a spatial rotation parameter $$\phi_{iter} \in \left[-\frac{\pi}{N_T}, \frac{\pi}{N_T}\right]$$

set within the UE at a specific resolution or a designated method.

Based on each of the set spatial rotation parameter values, a channel covariance matrix C' applying spatial rotation $\Phi(\phi_{iter})$ and DFT operation is given by the following Equation 5.

$$C'(\phi_{iter})=\Phi(\phi_{iter})C\Phi(\phi_{iter})^H \quad \text{[Equation 5]}$$

In this instance, in the channel covariance matrix(s) transformed as above, coefficients equal to or greater than a specific threshold are assumed to be valid values, and the number thereof is $n(C'(\phi_{iter}))$.

The UE finds a spatial rotation parameter $\phi_{iter}^{opt}$, in which $n(C'(\phi_{iter}))$ becomes the smallest value, through one-dimensional search.

After the UE reports this value to the base station and is configured so that the base station and the UE have the same spatial rotation matrix, the UE restores a channel covariance matrix C.

As another method, there may be a case in which the base station can use angular information corresponding to cluster(s) that affects an antenna of the base station and a global position angle and a sparse channel configuration of the UE, unlike a method of calculating a parameter using the above-described repetitive method.

In this instance, after the angular information is reported to the UE, and the UE calculates a spatial rotation parameter or the base station itself calculates the spatial rotation parameter, the base station may report this value to the UE and constitute a channel covariance matrix which should be fed back.

Rotation information that is the above new CSI contents is property of wideband (WB) CSI.

In order to provide more accurate subband (SB) CSI information, this may be reported in SB CSI property, and may also be transmitted in hybrid of the above two methods.

In this instance, a reporting method for the corresponding information may include a short-term method in which reporting is performed in each channel measured for time and/or frequency domains, and a long-term method in which reporting is performed at intervals of specific duration.

In addition, the above proposed technology has described a method of feeding back a channel using AoD, AoA, etc. based on two-dimensional (2D) channel modeling, but can be extended to channel considering ZoD, ZoA, etc. considering this as a three-dimensional (3D) channel model.

In particular, in a shape of ULA considered by the existing antenna array signal processing, an antenna shape (e.g., UPA, etc.) of 2D form may be considered.

In such a case, a channel considering all horizontal/vertical information may be configured and expressed by Kronecker product as shown in the following Equation 6.

$$h_k = \sum_{i=1}^{S} \sum_{j=1}^{S} \beta_{i,j}^k \Phi(\phi_k^h, \phi_k^v) a(\theta_{k,i}^h, \theta_{k,j}^v) \quad \text{[Equation 6]}$$

In Equation 6, a 2D array manifold vector and a spatial rotation matrix may be defined as in the following Equations 7 and 8.

$$a(\theta_{k,i}^h, \theta_{k,j}^v) = a_h(\theta_{k,i}^h) \otimes a_v(\theta_{k,j}^v)$$ [Equation 7]

$$\Phi(\phi_k^h, \phi_k^v) = \Phi(\phi_k^h) \otimes \Phi(\phi_k^v)$$ [Equation 8]

That is, the 2D array manifold vector may be configured through respective array manifold vectors assuming ULA in horizontal and vertical.

In addition, horizontal/vertical DOA values $\theta_{k,i}^h$ and $\theta_{k,j}^v$ may be estimated through uplink channel information.

In the same manner, a rotation matrix can be constituted using values in horizontal/vertical angular information.

Further, separate from the antenna structure, $N_T$ one-dimensional and two-dimensional DFT beams or a specific orthogonal basis configuration may be considered.

In payload information for CSI feedback, in a situation in which payload for CSI reporting is fixed by a system operation, the number of selecting columns of a transformation matrix, whether there is a spatial rotation parameter, and a resolution have a correlation in feeding back valid coefficients of channel information.

Each element can be selectively applied according to configuration of the UE or the base station, and thus a resolution of a spatial rotation parameter can be variously used.

Further, an amount of dominant DFT column set may be limited (to 1 or 2 columns), and a rotation parameter may be estimated with high accuracy and may be used in CSI feedback For example, there may be a case in which CSI payload size is configured to 100 bits, and the number of antennas of the base station is 30.

In this instance, 5 bits are used to designate a specific one column of a transformation matrix.

In this instance, if four columns are required based on angular information of the base station and the UE, 20 bits are used for column configuration, and the number of valid channel coefficients is 16 (=4×4).

When Hermitian property of channel information is considered, and quantization of each coefficient is performed in 7 bits, a total of 70 bits (=10×7) are used and an available load is finally 10 bits.

This can be used to increase a resolution of a spatial rotation parameter, or can increase the number of columns or adjust a quantization degree while fixing the number of bits required for the spatial rotation parameter.

And, when indicating/indicated channel configuration element (e.g., column, spatial rotation parameter, etc. of a transformation matrix) is UE-specifically configured and reported, the element has the highest accuracy.

However, there occurs a problem in that overhead according to this is increased.

Accordingly, when multiple UEs exist in a specific region of an angular domain for a beam of the base station, a beam of the corresponding index is configured to be supported by UEs belonging to the specific region.

In this instance, a spatial rotation parameter of the same value is used for UEs configured with the same beam index.

Alternatively, the base station may check angular information of each UE and then group the UEs. The base station may report an index of a transformation matrix to the UE and transmit the presence or absence of this to the UE.

A representative UE may be configured based on the UE with a signal intensity and a signal direction corresponding to an average value of an angular domain in the group as a column index of the transformation matrix and/or the spatial rotation parameter, and may report explicit CSI to the base station.

The UEs that do not receive a channel information reporting indication may receive a value transmitted by the representative UE from the base station and may configure channel information.

Thus, there is an effect in that the UE that does not report components of the channel information has decreasing payload for this.

Thus, the UE may indicate, to the base station, a column configuration index and a quantization degree of an additional transformation matrix, and a value for a difference of the spatial rotation parameter.

DFT direction information, that is long-term information, and a transmission period of a rotation parameter may be configured equally or differently, and period information may be configured by the UE.

The period information is possible even in the time/frequency domain.

The UE may also configure the accuracy of transmission information according to the period.

Thus, information in which a transmission period is relatively increased can be transmitted by increasing a resolution.

FIGS. 12 and 13 are flow charts illustrating an operation of a UE/base station that performs CSI reporting described in the present disclosure.

That is, FIGS. 12 and 13 illustrates an operation of the UE/base station including CSI reporting according to the above-described methods 1, 1-1, and 1-2.

CSI reporting of the UE according to the above-described method may be performed in a step S1230 of FIG. 12, and receiving the CSI reporting of the UE from the base station perspective may be performed in the step S1230.

More specifically, FIG. 12 illustrates an example of a UE operation to which a method of reporting CSI described in the present disclosure is applicable.

A UE may receive, from a base station, configuration information related to channel information quantization/transform in S1210.

The configuration information may include the number of quantization bits for each layer, mode configuration information, channel transform related information (e.g., transformation matrix information, etc.), and/or valid domain related information (e.g., the number of quantization bits per valid domain, etc.), and the like.

The configuration information may be previously defined on a system, and may be previously shared between the UE and the base station.

In this case, the step S1210 may be omitted.

The UE may receive, from the base station, a reference signal (RS) for CSI calculation/generation (e.g., CSI-RS, etc.) in S1220.

The UE may report, to the base station, CSI calculated/generated through a measurement by the received RS, etc. in S1230.

The corresponding CSI reporting may include channel coefficient quantization bit information of each layer, channel transform information of each layer, a valid value or valid domain configuration information for a transform channel per each layer, and/or quantization bit information per valid domain, and the like.

FIG. 13 illustrates an example of a base station operation to which a method of receiving CSI described in the present disclosure is applicable.

A base station may transmit, to a UE, configuration information related to channel information quantization/transform in S1310.

The configuration information may include the number of quantization bits for each layer, mode configuration information, channel transform related information (e.g., transformation matrix information, etc.), and/or valid domain related information (e.g., the number of quantization bits per valid domain, etc.), and the like.

The configuration information may be previously defined on a system, and may be previously shared between the UE and the base station.

In this case, the step S1310 may be omitted.

The base station may transmit, to the UE, a reference signal (RS) for CSI calculation/generation (e.g., CSI-RS, etc.) in S1320.

Afterwards, the base station may receive, from the UE, CSI reporting calculated/generated through a measurement by the RS, etc. in S1330.

The corresponding CSI reporting may include channel coefficient quantization bit information of each layer, channel transform information of each layer, a valid value or valid domain configuration information for a transform channel per each layer, and/or quantization bit information per valid domain, and the like.

FIG. 14 is a flow chart illustrating an operation method of a base station performing a method described in the present disclosure.

That is, FIG. 14 illustrates an operation method of a base station receiving channel state information in a wireless communication system.

A base station transmits, to a plurality of UEs, CSI-RS for calculating channel state information in S1410.

The base station receives, from the plurality of UEs, angular information related to a channel state between the base station and the plurality of UEs based on the CSI-RS in S1420.

The angular information may include at least one of a signal direction, an angular spread, a spatial rotation parameter, the number of beams of a transformation matrix, and an index of the transformation matrix.

The angular information may be received in one of periodic, aperiodic, and semi-persistent transmission types.

The base station transmits, to the plurality of UEs, configuration information for calculating the channel state based on the angular information in S1430.

The configuration information may include information determining an operation mode of the plurality of UEs.

The base station receives, from the plurality of UEs, the channel state information calculated based on the operation mode in S1440.

Before the step S1430, the plurality of UEs may be grouped based on the angular information.

The plurality of grouped UEs may be configured to be divided into a representative UE and a sub-UE.

The representative UE and the sub-UE may be determined based on unique indexes of the plurality of grouped UEs, and may be determined by a pre-configured criterion.

The representative UE and the sub-UE may be determined based on the operation mode. When the operation mode is 'ON', the UE may be configured as the representative UE, and when the operation mode is 'OFF', the UE may be configured as the sub-UE.

In this instance, when the operation mode is 'ON', the channel state information received in the step S1440 may be channel state information of the representative UE.

FIG. 15 is a flow chart illustrating an operation method of a UE performing a method described in the present disclosure.

That is, FIG. 15 illustrates an operation method of a UE transmitting channel state information in a wireless communication system.

A UE receives, from a base station, CSI-RS for calculating channel state information in S1510.

The UE transmits, to the base station, angular information related to a channel state between the base station and the UE based on the received CSI-RS in S1520.

The UE receives, from the base station, configuration information for calculating the channel state based on the angular information in S1530.

The configuration information may include information determining an operation mode of the plurality of UEs.

The UE transmits, to the base station, the channel state information calculated based on the operation mode in S1540.

In this instance, when the operation mode is 'ON', the UE may be configured as a representative UE, and when the operation mode is 'OFF', the UE may be configured as a sub-UE.

The step S1540 may be a step transmitting the channel state information of the UE only when the UE is configured as the representative UE.

With reference to FIGS. 14, 16 and 17, the following is given a description in which a method of receiving channel state information in a wireless communication system described in the present disclosure is implemented in a base station.

A base station for receiving channel state information in a wireless communication system may include a radio frequency (RF) module for transmitting and receiving a radio signal, and a processor functionally connected to the RF module.

A processor of a UE controls the RF module so that it receives, from the base station, control information related to PUCCH resources for transmitting multiple UCI.

The processor of the base station controls the RF module so that it transmits, to the plurality of UEs, CSI-RS for a measurement of channel state information.

The processor controls the RF module so that it receives, from the plurality of UEs, angular information related to a channel state between the base station and the plurality of UEs based on the CSI-RS.

The processor controls the RF module so that it transmits, to the plurality of UEs, configuration information for measuring the channel state based on the angular information.

The configuration information may include information determining an operation mode of the UE.

The processor controls the RF module so that it receives, from the plurality of UEs, the channel state information calculated based on the operation mode.

The processor controls the RF module so that it groups the plurality of UEs based on the angular information.

In this instance, the plurality of grouped UEs may be configured to be divided into a representative UE and a sub-UE. The processor controls the RF module so that it receives only channel state information of the UE configured as the representative UE.

Overview of Device to which the Present Disclosure is Applicable

In the present disclosure, downlink (DL) refers to communication from a base station to a UE, and uplink (UL) refers to communication from the UE to the base station. In the downlink, a transmitter may be a part of the base station, and a receiver may be a part of the UE. In the uplink, the transmitter may be a part of the UE, and the receiver may be a part of the base station. The base station may be represented as a first communication device, and the UE may be represented as a second communication device. The base station (BS) may be replaced by terms such as a fixed station, Node B, evolved-NodeB (eNB), next generation NodeB (gNB), a base transceiver system (BTS), an access point (AP), a network (5G network), an artificial intelligence (AI) system/module, a road side unit (RSU), a robot, an unmanned aerial vehicle (UAV), an augmented reality (AR) device, a virtual reality (VR) device, etc. Further, the terminal may be fixed or movable and may be replaced by terms such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a road side unit (RSU), a robot, an artificial intelligence (AI) module, an unmanned aerial vehicle (UAV), an augmented reality (AR) device, a virtual reality (VR) device, etc.

FIG. 16 illustrates a block configuration diagram of a wireless communication device to which methods described in the present disclosure are applicable.

Referring to FIG. 16, a wireless communication system includes a base station 1610 and multiple UEs 1620 located in an area of the base station.

Each of the base station 1610 and the UE 1620 may be represented as a wireless device.

The base station 1610 includes a processor 1611, a memory 1612, and a radio frequency (RF) unit 1613. The processor 1611 implements functions, processes, and/or methods described in FIGS. 1 to 15. Layers of radio interface protocol may be implemented by the processor 1611. The memory 1612 is connected to the processor 1611 and stores various types of information for driving the processor 1611. The RF unit 1613 is connected to the processor 1611 and transmits and/or receives radio signals.

The UE 1620 includes a processor 1621, a memory 1622, and a RF unit 1623.

The processor 1621 implements functions, processes, and/or methods described in FIGS. 1 to 15. Layers of radio interface protocol may be implemented by the processor 1621. The memory 1622 is connected to the processor 1621 and stores various types of information for driving the processor 1621. The RF unit 1623 is connected to the processor 1621 and transmits and/or receives radio signals.

The memories 1612 and 1622 may be inside or outside the processors 1611 and 1621 and may be connected to the processors 1611 and 1621 through various well-known means.

Further, the base station 1610 and/or the UE 1620 may have a single antenna or multiple antennas.

FIG. 17 illustrates another example of a block configuration diagram of a wireless communication device to which methods described in the present disclosure are applicable.

Referring to FIG. 17, a wireless communication system includes a base station 1710 and multiple UEs 1720 located in an area of the base station. The base station 1710 may be represented as a transmitter, and the UE 1720 may be represented as a receiver, or vice versa. The base station 1710 and the UE 1720 respectively include processors 1711 and 1721, memories 1714 and 1724, one or more Tx/Rx RF modules 1715 and 1725, Tx processors 1712 and 1722, Rx processors 1713 and 1723, and antennas 1716 and 1726. The processors implement functions, processes, and/or methods described above. More specifically, in DL (communication from the base station to the UE), an upper layer packet from a core network is provided to the processor 1711. The processor implements functionality of the L2 layer. In the DL, the processor provides the UE 1720 with multiplexing between a logical channel and a transport channel and radio resource allocation and is also responsible for signaling to the UE 1720. The transmit (Tx) processor 1712 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1716 via a separate Tx/Rx module (or transceiver 1715). Each Tx/Rx module may modulate an RF carrier with a respective spatial stream for transmission. At the UE, each Tx/Rx module (or transceiver 1725) receives a signal through the respective antenna 1726 of each Tx/Rx module. Each Tx/Rx module recovers information modulated onto an RF carrier and provides the information to the receive (Rx) processor 1723. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that are originally transmitted by the base station on the physical channel. The corresponding data and control signals are provided to the processor 1721.

UL (communication from the UE to the base station) is processed at the base station 1710 in a manner similar to the description associated with a receiver function at the UE 1720. Each Tx/Rx module 1725 receives a signal via the respective antenna 1726. Each Tx/Rx module provides an RF carrier and information to the Rx processor 1723. The processor 1721 may be associated with the memory 1724 that stores a program code and data. The memory may be referred to as a computer readable medium.

In the following description, the wireless communication device of FIG. 16 may operate as a receiving device or a transmitting device, and thus is represented and described as the receiving device or the transmitting device.

FIG. 18 illustrates an example of a signal processing module structure in a transmitting device. Here, the signal processing may be performed by processors of a base station/UE such as the processors 1611 and 1621 of FIG. 16.

Referring to FIG. 18, a transmitting device in a UE or a base station may include a scrambler 301, a modulator 302, a layer mapper 303, an antenna port mapper 304, a resource block mapper 305, and a signal generator 306.

The transmitting device may transmit one or more codewords. Each of coded bits in each codeword may be scrambled by the scrambler 301 and transmitted on a physical channel. The codeword may be referred to as a data column and may be equivalent to a transport block that is a data block provided by a MAC layer.

The scrambled bits are modulated to complex-valued modulation symbols by the modulator 302. The modulator 302 may modulate the scrambled bits according to a modulation scheme and dispose the modulated bits as complex-valued modulation symbols representing a location on signal constellation. There is no restriction in the modulation scheme, and m-PSK (m-Phase Shift Keying) or m-QAM (m-Quadrature Amplitude Modulation), etc. may be used in the modulation of coded data. The modulator may be referred to as a modulation mapper.

The complex-valued modulation symbols may be mapped to one or more transport layers by the layer mapper 303. The complex-valued modulation symbol on each layer may be mapped by the antenna port mapper 304 for the transmission on an antenna port.

The resource block mapper 305 may map the complex-valued modulation symbol for each antenna port to an appropriate resource element within a virtual resource block allocated for the transmission. The resource block mapper 305 may map the virtual resource block to a physical resource block according to an appropriate mapping scheme. The resource block mapper 305 may allocate the complex-valued modulation symbol for each antenna port to an appropriate subcarrier and multiplex it according to a user.

The signal generator 306 may modulate the complex-valued modulation symbol, i.e., an antenna-specific symbol for each antenna port through a specific modulation scheme, for example, an orthogonal frequency division multiplexing (OFDM) scheme to generate a complex-valued time domain OFDM symbol signal. The signal generator 306 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 306 may include an IFFT module, a CP inserter, a digital-to-analog converter (DAC), a frequency up-converter, and the like.

FIG. 19 illustrates another example of a signal processing module structure in a transmitting device. Here, the signal processing may be performed by processors of a base station/UE such as the processors 1611 and 1621 of FIG. 16.

Referring to FIG. 19, a transmitting device in a UE or a base station may include a scrambler 401, a modulator 402, a layer mapper 403, a precoder 404, a resource block mapper 405, and a signal generator 406.

The transmitting device may scramble coded bits within one codeword for the one codeword by the scrambler 401 and then transmit it via a physical channel.

The scrambled bits are modulated to complex-valued modulation symbols by the modulator 402. The modulator 402 may modulate the scrambled bits according to a predetermined modulation scheme and dispose the modulated bits as complex-valued modulation symbols representing a location on signal constellation. There is no restriction in the modulation scheme, and pi/2-BPSK (pi/2-Binary Phase Shift Keying), m-PSK (m-Phase Shift Keying), or m-QAM (m-Quadrature Amplitude Modulation), etc. may be used in the modulation of coded data.

The complex-valued modulation symbols may be mapped to one or more transport layers by the layer mapper 403.

The complex-valued modulation symbol on each layer may be precoded by the precoder 404 for the transmission on an antenna port. Here, the precoder 404 may perform a transform precoding on the complex-valued modulation symbols and then perform a precoding on the complex-valued modulation symbols. Alternatively, the precoder 404 may perform the precoding on the complex-valued modulation symbols without performing the transform precoding. The precoder 404 may process the complex-valued modulation symbols through a MIMO scheme according to multiple transmitting antennas to output antenna-specific symbols and may distribute the antenna-specific symbols to the corresponding resource block mapper 405. An output z of the precoder 404 may be obtained by multiplying an output y of the layer mapper 403 by a precoding matrix W of N×M, where N is the number of antenna ports, and M is the number of layers.

The resource block mapper 405 maps the complex-valued modulation symbol for each antenna port to an appropriate resource element within a virtual resource block allocated for the transmission.

The resource block mapper 405 may allocate the complex-valued modulation symbols to appropriate subcarriers and multiplex them according to a user.

The signal generator 406 may modulate the complex-valued modulation symbols through a specific modulation scheme, for example, an orthogonal frequency division multiplexing (OFDM) scheme to generate a complex-valued time domain OFDM symbol signal. The signal generator 406 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 406 may include an IFFT module, a CP inserter, a digital-to-analog converter (DAC), a frequency up-converter, and the like.

The signal processing of the receiving device may be configured in the reverse of the signal processing of the transmitter. Specifically, the processors 1611 and 1621 of the transmitting device perform decoding and demodulation on a radio signal received from the outside via antenna port(s) of a transceiver 23. The receiving device may include a plurality of multi-receiving antennas. Each signal received via the receiving antenna is recovered as a baseband signal, and then goes through multiplexing and MIMO demodulation and is recovered to a data column that the transmitting device originally intends to transmit. The receiving device may include a signal restorer for recovering a received signal as a baseband signal, a multiplexer for combining and multiplexing the received and processed signals, and a channel demodulator for modulating a multiplexed signal string to a corresponding codeword. The signal restorer, the multiplexer, and the channel demodulator may be configured as one integrated module to perform their functions or respective independent modules. More specifically, the signal restorer may include an analog-to-digital converter (ADC) for converting an analog signal into a digital signal, a CP remover for removing a CP from the digital signal, a FFT module which applies a fast Fourier transform (FFT) to a signal, from which the CP is removed, and outputs a frequency domain symbol, and a resource element demapper/an equalizer for recovering the frequency domain symbol as an antenna-specific symbol. The antenna-specific symbol is recovered to a transport layer by the multiplexer, and the transport layer is recovered by the channel demodulator to a codeword, that the transmitting device intends to transmit.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be executed by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR system and the 5G system (new RAT system), it can be applied to various wireless communication systems other than the 3GPP LTE/LTE-A/NR system.

The invention claimed is:
1. A method for a base station to receive channel state information in a wireless communication system, the method comprising:
transmitting, to a plurality of user equipments (UEs), a channel state information reference signal (CSI-RS) for calculating the channel state information;
receiving, from the plurality of UEs, angular information related to a channel state between the base station and the plurality of UEs based on the CSI-RS;
transmitting, to the plurality of UEs, configuration information for calculating the channel state based on the angular information,
wherein the configuration information includes information determining an operation mode of the plurality of UEs; and
receiving, from the plurality of UEs, the channel state information calculated based on the operation mode,
wherein the plurality of UEs is grouped into a plurality of grouped UEs configured to be divided into a representative UE and a sub-UE,
wherein the representative UE and the sub-UE are determined based on the operation mode, and
wherein a UE is configured as the representative UE when the operation mode is 'ON', and a UE is configured as the sub-UE when the operation mode is 'OFF'.

2. The method of claim 1, wherein the angular information includes at least one of a signal direction, an angular spread, a spatial rotation parameter, a number of beams of a transformation matrix, and an index of the transformation matrix.

3. The method of claim 1, wherein the angular information is received in one of periodic, aperiodic, and semi-persistent transmission types.

4. The method of claim 1, further comprising, before transmitting to the plurality of UEs the configuration information for calculating the channel state based on the angular information, grouping the plurality of UEs into the plurality of grouped UEs based on the angular information.

5. The method of claim 1, wherein the representative UE and the sub-UE are determined based on unique indexes of the plurality of grouped UEs, or determined by a pre-configured criterion.

6. The method of claim 1, wherein receiving the channel state information calculated based on the operation mode comprises receiving only the channel state information of a UE configured as the representative UE.

7. A method for a user equipment (UE) to transmit channel state information in a wireless communication system, the method comprising:
receiving, from a base station, a channel state information reference signal (CSI-RS) for calculating the channel state information;
transmitting, to the base station, angular information related to a channel state between the base station and the UE based on the received CSI-RS;
receiving, from the base station, configuration information for calculating a channel state based on the angular information,
wherein the configuration information includes information determining an operation mode of the UE; and
transmitting, to the base station, the channel state information calculated based on the operation mode,
wherein the UE is configured as a representative UE when the operation mode is 'ON', and the UE is configured as a sub-UE when the operation mode is 'OFF'.

8. The method of claim 7, further comprising, when the operation mode is 'ON', transmitting, to the base station, at least one of a number of beams of a transformation matrix, a beam index of the transformation matrix, a spatial rotation parameter, and a coefficient of a channel to which the spatial rotation parameter is applied.

9. The method of claim 7, wherein transmitting the channel state information calculated based on the operation mode comprises transmitting the channel state information of the UE only when the UE is configured as the representative UE.

10. A base station configured to receive channel state information in a wireless communication system, the base station comprising:
   a radio frequency (RF) module configured to transmit and receive a radio signal; and
   a processor functionally connected to the RF module, wherein the processor is configured to:
   transmit, to a plurality of user equipments (UEs), a channel state information reference signal (CSI-RS) for measuring the channel state information;
   receive, from the plurality of UEs, angular information related to a channel state between the base station and the plurality of UEs based on the CSI-RS;
   transmit, to the plurality of UEs, configuration information for measuring the channel state based on the angular information,
   wherein the configuration information includes information determining an operation mode of the plurality of UEs; and
   receive, from the plurality of UEs, the channel state information calculated based on the operation mode,
   wherein the plurality of UEs is grouped into a plurality of grouped UEs configured to be divided into a representative UE and a sub-UE,
   wherein the representative UE and the sub-UE are determined based on the operation mode, and
   wherein a UE is configured as the representative UE when the operation mode is 'ON', and a UE is configured as the sub-UE when the operation mode is 'OFF'.

11. The base station of claim 10, wherein the processor is configured to group the plurality of UEs into the plurality of grouped UEs based on the angular information.

12. The base station of claim 11, wherein the plurality of grouped UEs is configured to be divided into a representative UE and a sub-UE,
   wherein the processor is configured to receive only the channel state information of a UE configured as the representative UE.

* * * * *